United States Patent
Weichelt et al.

(10) Patent No.: US 12,366,727 B2
(45) Date of Patent: Jul. 22, 2025

(54) LENS SYSTEM, AND A METHOD AND COMPUTER PROGRAM PRODUCT FOR CONTROLLING THE LENS SYSTEM

(71) Applicant: Sony Group Corporation, Tokyo (JP)

(72) Inventors: Christin Weichelt, Stuttgart (DE); Markus Kamm, Stuttgart (DE); Motoyuki Otake, Stuttgart (DE); Takumi Matsui, Stuttgart (DE); Manabu Ishioka, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 199 days.

(21) Appl. No.: 17/768,872

(22) PCT Filed: Oct. 16, 2020

(86) PCT No.: PCT/EP2020/079176
§ 371 (c)(1),
(2) Date: Apr. 14, 2022

(87) PCT Pub. No.: WO2021/078641
PCT Pub. Date: Apr. 29, 2021

(65) Prior Publication Data
US 2024/0111129 A1    Apr. 4, 2024

(30) Foreign Application Priority Data
Oct. 24, 2019  (EP) .................................. 19205180

(51) Int. Cl.
*G02C 7/02*     (2006.01)
*G02B 13/00*    (2006.01)

(52) U.S. Cl.
CPC ................. *G02B 13/003* (2013.01)

(58) Field of Classification Search
CPC ................ G02B 13/003; G02B 13/009; G02B 13/0075; G02B 3/0081; G02B 15/14
See application file for complete search history.

(56) References Cited

U.S. PATENT DOCUMENTS

| 3,305,294 A | 2/1967 | Alvarez |
| 3,583,790 A | 6/1971 | Baker |

(Continued)

FOREIGN PATENT DOCUMENTS

| CN | 103988109 A | 8/2014 | |
| GB | 2547590 A * | 8/2017 | ............. G02B 13/20 |

(Continued)

OTHER PUBLICATIONS

Sergio Barbero, The Alvarez and Lohmann Refractive Lenses Revisited, 17 Optics Express 9376-9390 (2009). (Year: 2009).*

(Continued)

*Primary Examiner* — Thomas K Pham
*Assistant Examiner* — Wesley Scott Ashton
(74) *Attorney, Agent, or Firm* — XSENSUS LLP

(57) ABSTRACT

A lens system for an imaging device is provided, the lens system comprising: a first lens group, having a fixed position along an optical axis Z of the lens system, the first lens group comprising a pair of lenses, each of the pair of lenses having at least one lens surface that is a free-form surface, and a second lens group, arranged along the optical axis Z of the lens system, comprising a plurality of rotationally symmetrical lenses; wherein a first lens of the pair of lenses of the first lens group is configured to be moveable along a Y-axis of the lens system perpendicular to the optical axis Z of the lens system, and a second lens of the pair of lenses of the first lens group is configured to be moveable in an opposite direction to the first lens of the pair of lenses along the Y-axis.

20 Claims, 14 Drawing Sheets

(56) References Cited

U.S. PATENT DOCUMENTS

| | | | | | |
|---|---|---|---|---|---|
| 4,925,281 | A | * | 5/1990 | Baker | G02B 7/10 359/708 |
| 5,189,556 | A | * | 2/1993 | Ohtsuka | H04N 23/16 359/663 |
| 5,844,725 | A | * | 12/1998 | Itoh | G02B 15/1421 359/692 |
| 5,982,560 | A | * | 11/1999 | Moon | G02B 15/1421 359/692 |
| 7,710,658 | B2 | * | 5/2010 | Dowski, Jr. | G02B 27/0025 359/679 |
| 9,575,296 | B2 | * | 2/2017 | Kimura | G02B 15/1425 |
| 11,288,416 | B2 | * | 3/2022 | Zimanyi | G02C 7/081 |
| 12,181,647 | B2 | * | 12/2024 | Otake | G02B 15/1461 |
| 2006/0023318 | A1 | | 2/2006 | Yoshida | |
| 2006/0291069 | A1 | * | 12/2006 | Yoshida | G02B 15/04 359/676 |
| 2006/0291513 | A1 | * | 12/2006 | Yoshida | G02B 15/02 372/38.04 |
| 2014/0177071 | A1 | * | 6/2014 | Saito | G02B 15/177 359/691 |
| 2014/0192427 | A1 | * | 7/2014 | Bueler | G02B 27/0025 359/824 |
| 2014/0285905 | A1 | * | 9/2014 | Zhou | G02B 7/10 359/696 |
| 2015/0316748 | A1 | | 11/2015 | Cheo et al. | |
| 2019/0041601 | A1 | * | 2/2019 | Hou | G02B 13/009 |

FOREIGN PATENT DOCUMENTS

| | | | | |
|---|---|---|---|---|
| JP | H11242258 | A | | 9/1999 |
| JP | 2007004060 | A | | 1/2007 |
| JP | 2007004061 | A | * | 1/2007 ............ G02B 15/02 |
| JP | 2007004063 | A | * | 1/2007 ............ G02B 15/04 |
| WO | WO-2013052014 | A1 | * | 4/2013 ............ B81B 5/00 |
| WO | 2019/078221 | A1 | | 4/2019 |
| WO | WO-2020153996 | A1 | * | 7/2020 ......... G02B 17/0896 |

OTHER PUBLICATIONS

Yongchao Zou et al., Endoscope Zoom Optics Using Alvarez Lenses, 2017, pp. 1-2 [online], [retrieved Sep. 26, 2024], retrieved from the Internet <URL: https://ieeexplore.ieee.org/stamp/stamp.jsp?tp=&arnumber=8051495>. (Year: 2017).*

Andy Rowlands, Physics of Digital Photography, Chapter 1, 2017, pp. 1-1 to 1-62 [online], [retrieved Nov. 02, 2023], retrieved from the Internet <URL: https://iopscience.iop.org/book/mono/978-0-7503-1242-4/hapter/bk978-0-7503-1242-4ch1.pdf>. (Year: 2017).*

Ananya Pritam Gogoi, Spare Parts Standardization and Its Impact on Purchasing Leverage, 2018, pp. 1-15 [online], [retrieved Oct. 17, 2023], retrieved from the Internet <URL: https://www.beroeinc.com/whitepaper/standardization-impact-on-purchasing/#:~:text=Parts . . . %20adjustment>. (Year: 2018).*

Shane Colburn et al., Varifocal Zoom Imaging with Large Area Focal Length Adjustable Metalenses, 5 OPTICA 825-831 (2018). (Year: 2018).*

Changlun Hou et al., Ultra Slim Optical Zoom System Using Alvarex Freeform Lenses, 11 IEEE Photonics Journal 6902110-1 to 6902110-10 (2019). (Year: 2019).*

A machine English translation obtained Sep. 25, 2024 of WO 2019/078022 A1, and filed with a WO 2019/078221 A1. (Year: 2024).*

Yongchao Zou et al., Ultra-compact Optical Zoom Endoscope Using Solid Tunable Lenses, 25 Optics Express 20675-20688 (2017). (Year: 2017).*

Changlun Hou et al., Ultra Slim Optical Zoom System Using Alvarez Freeform Lenses, 11 IEEE Photonics Journal 6902110-1 to 6902110-11 (2019). (Year: 2019).*

International Search Report and Written Opinion mailed on Jan. 25, 2021, received for PCT Application PCT/EP2020/079176, Filed on Oct. 16, 2020, 11 pages.

Lohmann, "A New Class of Varifocal Lenses", Applied Optics, vol. 9, No. 7, Jul. 1970, pp. 1669-1671.

* cited by examiner

LENS SYSTEM, AND A METHOD AND COMPUTER PROGRAM PRODUCT FOR CONTROLLING THE LENS SYSTEM

CROSS-REFERENCE TO RELATED APPLICATIONS

The present application is based on PCT filing PCT/EP2020/079176, filed Oct. 16, 2020, which claims the benefit of EP 19205180.3 filed on Oct. 24, 2019, the entire contents of each are incorporated herein by reference.

BACKGROUND

Field of the Disclosure

The present invention relates to a lens system, and a method and computer program product for controlling the lens system.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

In recent years imaging systems, using photoelectric conversion imaging devices such as a charge coupled device (CCD) or a complementary metal oxide semiconductor (CMOS), have experienced a rapid expansion in use. In part, this is due to recent technological advances in microfabrication technology, which has enabled the processing circuitry required to operate the imaging systems (and the storage units required to store the images captured by the imaging systems) to be incorporated within a wider range of electronic devices, including portable electronic devices (such as mobile phones, tablet computing devices and laptop computing devices).

Lens systems form a key component of the imaging systems used in these electronic devices. The lens systems focus light from a scene onto the imaging device of the imaging system, such that the imaging device converts the light from the scene into an electrical output, which is itself converted into a digital image of the scene. With the incorporation of imaging systems into portable electronic devices, there is a desire to decrease the bulk and form factor of the lens system. However, this is difficult to achieve, particularly in the case for imaging systems, which include zoom lenses (such as telephoto lenses). This is because the level of zoom provided by the zoom lens depends on the maximum focal length of the lens system (with an increase in focal length increasing the length along the optical axis of the lens system).

As such, it can be difficult to achieve a lens system and imaging device having the desired optical properties with a form factor suitable for incorporation into portable electronic devices.

It is an aim of the present disclosure to address these issues.

SUMMARY

A brief summary about the present disclosure is provided hereinafter to provide basic understanding related to certain aspects of the present disclosure.

According to a first aspect of the disclosure, a lens system for an imaging device is provided, the lens system comprising: a first lens group, having a fixed position along an optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and a second lens group, arranged along the optical axis Z of the lens system, comprising a plurality of rotationally symmetrical lenses; wherein a first lens of the pair of lenses of the first lens group is configured to be moveable along a Y-axis of the lens system perpendicular to the optical axis Z of the lens system, and a second lens of the pair of lenses of the first lens group is configured to be moveable in an opposite direction to the first lens of the pair of lenses along the Y-axis, in accordance with the movement of the first lens of the pair of lenses, to change a refractive power of the lens system; and wherein the second lens group is configured to be moveable along the optical axis Z of the lens system in accordance with the movement of the pair of lenses along the Y-axis to maintain an image position of the lens system.

According to a second aspect of the disclosure, a method of controlling a lens system for an imaging device is provided, the lens system comprising: a first lens group, having a fixed position along an optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and a second lens group, arranged along the optical axis X of the lens system, comprising a plurality of rotationally symmetrical lenses; wherein the method comprises: controlling a movement of a first lens of the pair of lenses of the first lens group along a Y-axis of the lens system perpendicular to the optical axis Z of the lens system and a movement of a second lens of the pair of lenses of the first lens group in an opposite direction to the first lens of the pair of lenses along the Y-axis in accordance with the movement of the first lens of the pair of lenses along the Y-axis, to change a refractive power of the lens system; and controlling a movement of the second lens group along the optical axis Z of the lens system in accordance with the movement of the pair of lenses along the Y-axis to maintain an image position of the lens system.

According to a third aspect of the disclosure, a computer program product comprising instructions, which, when the program is executed by the computer, cause the computer to carry out a method of controlling a lens system for an imaging device is provided, the lens system comprising: a first lens group, having a fixed position along an optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and a second lens group, arranged along the optical axis X of the lens system, comprising a plurality of rotationally symmetrical lenses; wherein the method comprises: controlling a movement of a first lens of the pair of lenses of the first lens group along a Y-axis of the lens system perpendicular to the optical axis Z of the lens system and a movement of a second lens of the pair of lenses of the first lens group in an opposite direction to the first lens of the pair of lenses along the Y-axis in accordance with the movement of the first lens of the pair of lenses along the Y-axis, to change a refractive power of the lens system; and controlling a movement of the second lens group along the optical axis Z of the lens system in accordance with the movement of the pair of lenses along the Y axis to maintain an image position of the lens system.

With the lens system, method and computer program product according to embodiments of the disclosure, the length and form factor of a zoom lens along its optical axis can be significantly reduced, while maintaining the first lens group (including a pair of freeform lenses) and the image plane in a fixed position along the optical axis. The present disclosure is not particularly limited to these technical effects, there may be others as will become apparent to the skilled person when reading the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
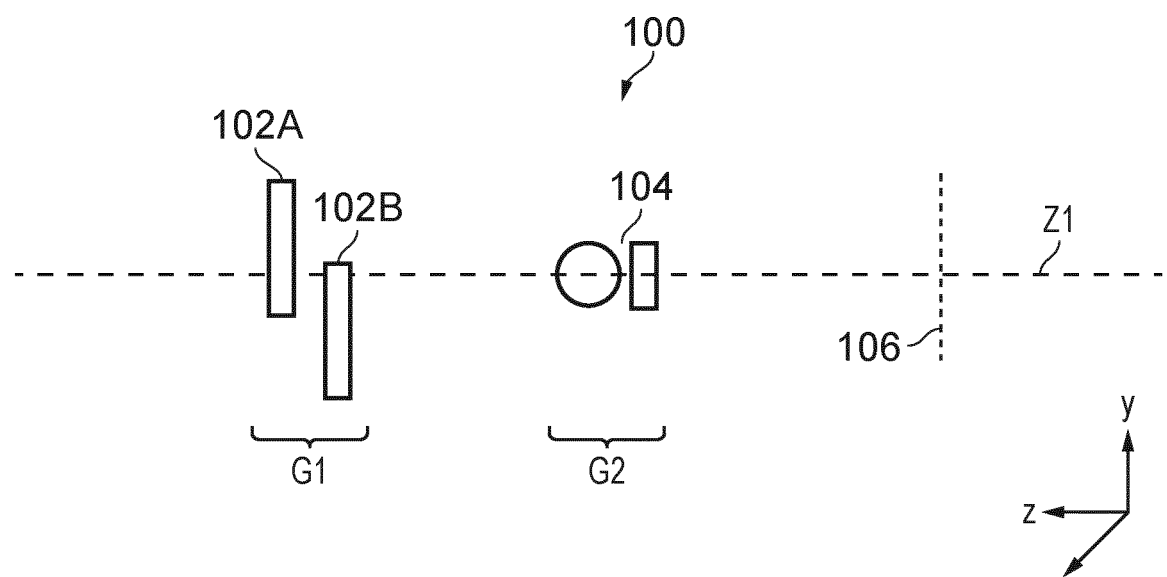
FIG. 1 illustrates a lens system in accordance with embodiments of the disclosure.

Referring now to the drawings, wherein like reference numerals designate identical or corresponding parts throughout the several views.

A known variable focal length lens system (zoom lens) includes a plurality of lens groups, which are movable along the optical axis direction of the lens system. The movement of the lens groups along the optical axis direction of the lens system changes the focal length of the lens system and retains the image plane in a constant position along the optical axis. The lens system is, in general, in its most compact form (having the smallest length along the optical axis) when it is in a wide-angle state (with the smallest focal length). Increasing the focal length of the lens system will increase the level of zoom provided by the lens system. However, increasing the focal length of the system requires movement of the plurality of lens groups along the optical axis of the lens system, which increases the total track length of the lens system along the optical axis. This increases the bulk and form factor of the lens system, limiting the compactness of an imaging device, which incorporates the lens system.

As such, there is a desire to provide a variable focal length lens system with reduced track length, having a constant image plane position along the optical axis of the lens.

Accordingly, a lens system for an imaging device is provided in accordance with embodiments of the disclosure.

Lens System

A lens system according to embodiments of the disclosure includes a first lens group, having a fixed position along an optical axis Z of the lens system, the first lens group comprising a pair of lenses each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system. The lens system also includes a second lens group, arranged along the optical axis Z of the lens system, the second lens group including a plurality of rotationally symmetrical lenses. In the lens system according to embodiments of the disclosure, a first lens of the of the first lens group is configured to be moveable along a Y-axis of the lens system perpendicular to the optical axis Z of the lens system, and a second lens of the pair of lenses of the first lens group is configured to be moveable in an opposite direction to the first lens of the pair of lenses along the Y-axis in accordance with the movement of the first lens of the pair of lenses, to change a refractive power of the lens system. The second lens group is configured to be moveable along the optical axis Z of the lens system in accordance with the movement of the pair of lenses along the Y-axis to maintain a fixed image position of the lens system.

FIG. 1 illustrates an example lens system 100 for an imaging device in accordance with embodiments of the disclosure. The lens system 100 is a variable focus (zoom) lens system.

In the example illustration of FIG. 1, the Z-axis is defined as the axis along an optical axis Z1 of the image system 100. The Y-axis is perpendicular to the Z-axis of the system and is oriented vertically with respect to the image system 100. The X-axis is defined as the axis perpendicular to both the Z-axis and the Y-axis.

The lens system 100 includes a first lens group G1. The position of the first lens group G1 is fixed on the optical axis Z1 of the lens system 100. That is, the first lens group G1 is configured at a first location on the optical axis Z1 of the lens system 100, and remains at that position on the optical axis Z1 of the lens system 100 during the operation of the lens system (that is, as the lens system 100 moves from a wide-angle state to a telephoto state). In other words, the first lens group G1 does not need to move along the optical axis Z1 of the lens system 100.

The first lens group G1 includes a pair of lenses 102A and 102B. Each of the first lens 102A and the second lens 102B of the pair of lenses of the first lens group G1 has at least one lens surface that is a free-form surface. That is, the first lens 102A and the second lens 102B of the pair of lenses of the first lens group G1 are free-form lenses. These two free-from lenses have the same shape. However, the second lens 102B is arranged oppositely to the first lens 102A (being rotated 180°) about the optical axis Z1 of the lens system.

As illustrated in FIG. 1, the first lens 102A and the second lens 102B of the pair of the lenses of the first lens group G1 can be arranged to be partially overlapping when viewed along the optical axis Z1 of the lens system 100. That is, when viewed along the optical axis Z1 of the lens system 100, at least a portion of the first lens 102A and the second lens 102B can be arranged to overlap, such that the pair of lenses provide a combined refractive power along the optical axis Z1 of the lens system.

Each of the first lens 102A and the second lens 102B of the pair of lenses of the first lens group G1 are configured to be moveable along the Y-axis of the lens system. This is explained in more detail with reference to FIG. 2 of the present disclosure.

The lens system 100 further includes a second lens group G2. The second lens group is arranged along the optical axis Z1 of the lens system 100 (that is, such that a least a portion of the second lens group G2 intercepts the optical axis Z1 of the lens system 100, when viewed along the optical axis Z1 of that lens system).

The second lens group G2 of the lens system 100 includes a number of rotationally symmetric lenses 104. These rotationally symmetric lenses 104 may include spherical lenses and/or aspherical lenses, for example. The second lens group G2 remains in a fixed location along the Y-axis of the lens system 100 in use. However, the second lens group G2 is configured to be moveable along the Z-axis of the lens system 100 in use. Specifically, the location of the second lens group G2 is moveable along the optical axis Z1 between the fixed position of the first lens group G1 and the image plane 106.

Figure 2A:
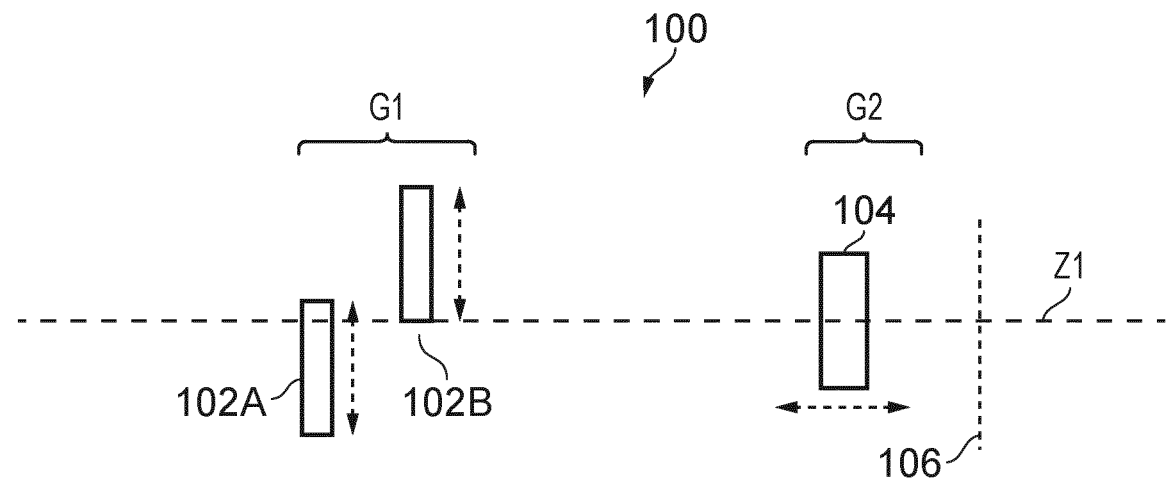
FIG. 2A illustrates movement of the lenses of a lens system when changing from a wide-angle state to a telephoto state in accordance with embodiments of the disclosure.
Figure 2B:
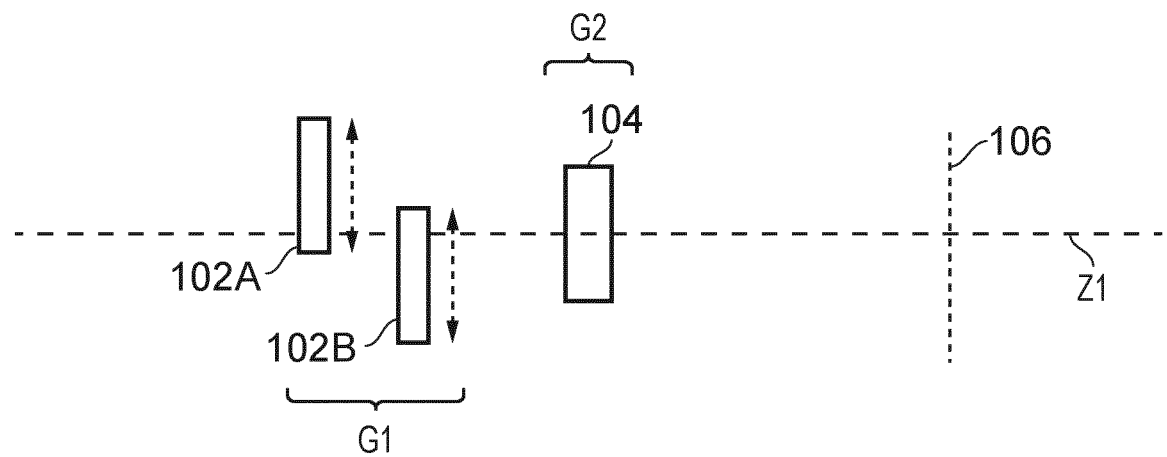
FIG. 2B illustrates movement of the lenses of a lens system when changing from a wide-angle state to a telephoto state in accordance with embodiments of the disclosure.

Referring now to FIGS. 2A and 2B, the movement of the lenses of the lens system 100 when changing from a wide-angle state to a telephoto state, in accordance with embodiments of the disclosure, is illustrated.

In the example of FIGS. 2A and 2B, the second lens group G2 is illustrated by a single element. However, it will be appreciated that, as described with reference to FIG. 1 of the present disclosure, the second lens group G2 includes a number of rotationally symmetric lenses. That is, in some examples, a plurality of rotationally symmetrical lenses may be provided in the second lens group.

FIG. 2A illustrates the lens system 100 in a first state. The configuration of the lens system in this first state is the configuration the variable focal length lens system will be in when a low zoom power has been selected. That is, the first state is a wide-angle state of the lens system 100.

As described with reference to FIG. 1 of the present disclosure, each of the first lens 102A and the second lens 102B remains in a fixed position along the optical axis Z1 of the lens system 100 during use, but is configured to be independently moveable along the Y-axis of the lens system. In other words, the position of the first lens 102A and/or the second lens 102B relative to the optical axis Z1 of the lens system can be vertically displaced along the Y-axis. Furthermore, the position of the second lens group G2 is moveable along the optical axis Z1 of the lens system (but remains at a fixed positon along the Y-axis).

Accordingly, in this example wide-angle state, the first pair of freeform lenses can be configured such that a predetermined portion of the first lens 102A and the second lens 102B overlap along the optical axis Z1. That is, the combined refractive power of the first group of lenses G1 of the first lens 102A and the second lens 102B, in part determines the effective focal length of the lens system 100. A reduction in the combined refractive power of the lenses increases the focal length of the system and increases the zoom (or magnification) provided by the lens system. As such, in a maximum wide-angle configuration, the first lens 102A and the second lens 102B are arranged along the Y-axis in order produce the highest combined refractive power (lowest effective focal length) of the lens system 100.

The position of the second group of lenses G2 along the optical axis of the lens system 100 is configured such that, for the arrangement of the first lens 102A and the second lens 102B of the first group of lenses G1 (that is, for the given focal length of the lens system in this configuration), the image plane is located at a position 106 along the optical axis Z1 of the lens system 100.

The configuration of the lens system 100 in a second state is illustrated in FIG. 2B of the present disclosure. The position of the lenses of the first lens group and the second lens group has been changed, in comparison to the first state illustrated in FIG. 2A of the present disclosure, in order to vary the focal length of the lens system 100. Specifically, the configuration of the lens system 100 in the second state illustrated in FIG. 2B of the present disclosure results in the lens system 100 having an increased focal length in comparison to the focal length of the lens system when in the first state illustrated in FIG. 2A. Therefore, whereas the first state illustrated in FIG. 2A represents the configuration of the lens system 100 in a wide-angle configuration, the second state illustrated in FIG. 2B represents the configuration of the lens system 100 in a telephoto configuration.

It will be appreciated that the positions of the first lens group G1 and the second lens group G2 may be smoothly varied between the first configuration (illustrated in FIG. 2A) and the second configuration (illustrated in FIG. 2B), such that any desired focal length between these two example configurations can be achieved by lens system 100.

Now, in comparison to the state illustrated in FIG. 2A, the first lens 102A and the second lens 102B have been moved along the Y-axis of the lens system. The relative change in position between the first lens 102A and the second lens 102B provides a change of the combined refractive power of the lens system 100, resulting in a change in the focal length of the lens system 100. This is because the movement of the free-form lens along the Y-axis results in a different portion of the free-form lens, with a different shape and/or thickness, coming into alignment with the optical axis of the lens system. Now, in this example, the lenses 102A and 102B have shifted by a similar amount (in an opposite direction) along the Y-axis of the lens system 100. That is, the first lens 102A has moved vertically upward along the Y-axis of the lens system 100 by a first amount, while the second lens 102B has moved vertically downward along the Y-axis of the lens system 100 by a second amount (the magnitude of the second amount being similar to the magnitude of the first amount). However, in some examples, the two lenses 102A and 102B of the first lens group G1 may move by the same amount in opposite directions along the Y-axis of the lens system 100. In other examples, only one of the lenses of the first lens system will move along the Y-axis of the lens system, to cause a change in the relative position of the first lens 102A and the second lens 102B.

As noted above, this relative movement of the first free-form lens 102A and the second free-form lens 102B along the Y-axis of the lens system 100 results in a change of the focal length of the lens system 100. As such, in the lens system 100, it is possible to shift the movement of the lenses that is required to change the focal length of the lens system from a direction along the optical axis to a movement, of small displacement, along an axis perpendicular to the optical axis of the system (the Y-axis of the lens system in this example). This enables a reduction in the form factor, or more specifically in the length, of the variable focal length lens system.

The change of focal length of the lens system, owing to the relative movement of the first and second lens of the first lens group, results in a change of the image position along the optical axis of the lens system Z1. This is undesirable, as it requires movement of an image sensor along the optical axis Z1 of the lens system in order that the image sensor can still capture a sharp image produced by the lens system 100. Moreover, movement of the image sensor along the optical axis, such that the image sensor is located at the image plane of the lens system, will result in an increase in the length of the lens system 100 along the optical axis Z1 of the lens system 100.

However, according to embodiments of the disclosure, the second lens group G2 is provided which is moveable along the optical axis Z1 of the lens system 100, such that the second lens group G2 can be moved in order to compensate for the change in focal length of the lens system and maintain a stable positon of the image plane along the optical axis Z1 of the lens system. That is, as illustrated in FIGS. 2A and 2B, when the lens system 100 changes from a wide-angle state to a telephoto state (or indeed any selection of focal length of the lens system therebetween) the second lens group G2 is moved along the optical axis Z1 of the lens system 100 such that the image plane remains in a fixed positon along the optical axis Z1 of the lens system 100 during use (that is, for any configuration of the lens system 100).

In other words, the movement of the second group G2 of the lens system 100 along the optical axis Z1 of the lens system 100 in accordance with the movement of the first lens group G1 compensates for the change in image plane position, which accompanies the change in focal length.

As such, it will be appreciated that the length of the lens system 100 along the optical axis (defined as the distance between the first lens group G1 and the location of the image plane 106 on the optical axis of the lens system) remains constant when changing from the wide-angle state to the telephoto state (with the change in focal length being provided by a small displacement of the first lens group along the Y-axis of the lens system). With the lens system 100 according to embodiments of the disclosure, the length and form factor of a zoom lens along its optical axis can therefore be significantly reduced, while maintaining the first lens group and the image plane in a fixed position along the optical axis.

Furthermore, the use of the same shape lens for the first lens 102A and the second lens 102B (oppositely rotated along the optical axis Z1 of the lens system 100) is especially effective for the robustness of the lens system. That is, as the shape of the free-form lens changes smoothly (which can, in certain examples, be described as an 'S' shape) any performance deterioration caused by fluctuation of the moving amount and decentering of the two free-form surfaces is reduced.

In fact, movement of the same or similar magnitude in opposite directions along the Z-axis of the lens system 100 is particularly effective to obtain a good optical performance, as aberrations caused by asymmetrical lens shapes are cancelled out and reduced.

Lens Surface

It will be appreciated that a number of different polynomial expressions can be used in order to describe the shape of the free-form lens surfaces of the first and second lens of the first lens group according to embodiments of the disclosure.

In certain examples, the shape of the free-form surfaces of the first and/or second free-form lens of the first lens group G1 may be expressed using an XY polynomial:

$$z_{sag} = \frac{cr^2}{1+\sqrt{1-(1+k)c^2r^2}} + C_3 y + C_4 x^2 + \qquad (1)$$
$$C_6 y^2 + C_8 x^2 y + C_{10} y^3 + C_{13} x^2 y^2 + C_{19} x^2 y^3 + C_{21} y^5 +$$
$$C_{11} x^4 + C_{15} y^4 + C_{17} x^4 y + C_{24} x^4 y^2 + C_{26} x^2 y^4 +$$

-continued $$C_{32}x^4y^3 + C_{34}x^2y^5 + C_{22}x^6 + C_{28}y^6 +$$
$$C_{36}y^7 + C_{30}x^6y + C_{39}x^6y^2 + C_{41}x^4y^4 + C_{43}x^2y^6 +$$
$$C_{51}x^4y^5 + C_{53}x^2y^7 + C_{37}x^8 + C_{45}y^8 +$$
$$C_{47}x^8y + C_{49}x^6y^3 + C_{51}x^4y^5 + C_{55}x^2y^7 +$$
$$C_{55}y^9 + C_{55}x^2y^7 + C_{56}x^{10} + C_{58}x^8y^2 +$$
$$C_{60}x^6y^4 + C_{62}x^4y^6 + C_{64}x^2y^8 + C_{66}y^{10}$$

In this Equation, $z_{sag}$ is the amount of sag in the Z-axis direction of the lens surface, c is the vertex curvature, r is the radial distance, k is the conic constant, and $C_3$ to $C_{66}$ are coefficients of the XY polynomial. A specific numerical example of a lens system defined using an XY polynomial is provided with reference to FIG. 4 of the present disclosure (described in more detail below).

The free-form lenses of the lens system are configured to be moveable along the direction of the Y-axis of the lens system. As such, the shape of the free-form lenses may be chosen in order to be symmetrical to the Y-Z plane. This means that only polynomial coefficients with even degrees of x need be used. Moreover, in certain examples, the shape of the second free-form lens of the first lens group G1 is chosen to have the same shape as the first free-form lens of the lens system (but is arranged oppositely (rotated by 180 degrees) about the Z-axis to the first free-form lens, such that the odd degree coefficients of Y change sign while the same value may be kept for the same coefficient on both the first and second free-form lens.

Alternatively, in certain example embodiments, the shape of the free-form surfaces of the first and/or second free-form lens of the first lens group G1 may be expressed using a set of Fringe Zernike polynomials up to the $12^{th}$ order, added to a base conic:

$$z_{sag} = \frac{cr^2}{1+\sqrt{1-(1+k)c^2r^2}} + \sum_{j=1}^{37} C_j ZF_j \quad (2)$$

In this Equation, $z_{sag}$ is the amount of sag in the Z-axis direction of the lens surface, c is the vertex curvature, r is the radial distance, k is the conic constant, $ZF_j$ is the jth Fringe Zernike polynomial (range of j: 1 to 37) and $C_j$ is the coefficient for $ZF_j$. A specific example of a lens system defined using Fringe Zernike polynomials is provided with reference to FIG. 9 of the present disclosure (described in more detail below).

Furthermore, in certain examples, the rotationally symmetric aspherical surfaces of the lenses of the second lens group G2 of lens system 100 may be expressed as:

$$z_{sag} = \frac{cr^2}{1+\sqrt{1-(1+k)c^2r^2}} + Ar^4 + \quad (3)$$
$$Br^6 + Cr^6 + Dr^{10} + Er^{12} + Fr^{14} + Gr^{16} + Hr^{18} + Jr^{20}$$

where $z_{sag}$ is the amount of sag in the Z-axis direction of the lens surface, c is the vertex curvature, r is the radial distance, k is the conic constant, and A to J are aspheric coefficients. Specific numerical examples of these lenses are provided with reference to FIGS. 4 and 9 of the present disclosure (defined in more detail below).

Configuration of the Lens System

Next, an example configuration of the variable focal length lens system according to embodiments of the disclosure will be described.

According to embodiments of the present disclosure, the change of the refractive power of the variable focal length lens system is based on the shift amount of the first free-form lens and the second free-form lens of the first lens group G1 along the Y-axis of the lens system. This enables the zoom-ratio (the focal length at the maximum telephoto state/the focal length at the maximum wide angle state) to be increased. However, potential aberrations also increase with this configuration.

Therefore, in certain examples, it is desirable to satisfy the following conditional expression (4) for the variable focal length lens system:

$$0.05 < |\varphi 12W| \cdot fw < 0.35 \quad (4)$$

where $\varphi 12W$ is the combined axial refractive power of the pair of lenses of the first lens group in a maximum wide-angle state of the lens system, and fw is the focal length of the lens system in the maximum wide-angle state.

Also, in certain examples, it is desirable to satisfy the following conditional expression (5) for the variable focal length lens system at the maximum telephoto position:

$$0.25 < |\varphi 12T| \cdot ft < 0.95 \quad (5)$$

where $\varphi 12 T$ is the combined axial refractive power of the pair of lenses of the first lens group in a maximum telephoto state of the lens system, and ft is the focal length of the lens system in the maximum telephoto state.

To avoid anamorphic effects in the image, the refractive power difference of the two free-form lenses along the X-axis and the Y-axis in relation to the respective focal length of the lens system should be small in each zoom position. Therefore, in certain examples, it is desirable to satisfy the following conditional expressions (6) and (7) for the variable focal length lens system:

$$|\varphi 12WX - \varphi 12WY| \cdot fw < 0.03 \quad (6)$$

$$|\varphi 12TX - \varphi 12TY| \cdot ft < 0.03 \quad (7)$$

where $\varphi 12WX$ is the combined axial refractive power of the pair of lenses of the first lens group along an X-axis of the lens system, perpendicular to the Y-axis and the optical axis Z of the lens system, in a maximum wide-angle state of the lens system; $\varphi 12WY$ is the combined axial refractive power of the pair of lenses of the first lens group along the Y-axis in the maximum wide-angle state; $\varphi 12TX$ is the combined axial refractive power of the pair of lenses of the first lens group along the X-axis at a maximum telephoto state of the lens system; $\varphi 12TY$ is the combined axial refractive power of the pair of lenses of the first lens group along the Y-axis at the maximum telephoto state of the lens system; fw is the focal length of the lens system at the maximum wide-angle state; and ft is the focal length of the lens system at the maximum telephoto state.

Exceeding the upper limit of the conditional expressions (6) and (7), or alternatively, falling below these limits, is not desirable in certain examples since the field angle difference between the direction of the X-axis and the direction of the Y-axis becomes large.

Specifically, in certain examples, in order to further enhance the performance of the lens system, the refractive power difference of the free-form lenses (responsible for the focal length difference of the lens system) between the direction of the X-axis and the direction of the Y-axis should be minimal, even if the subject position changes from infinity to the close range. If the focus length difference between the direction of the X-axis and the direction of the Y-axis becomes large, the focus position between both directions is shifted. Therefore, in certain examples, it is desirable to satisfy the following conditional expressions (8) and (9) for the variable focal length lens system:

$$0.85 < |\varphi 12WX/(\varphi 12WY)| < 1.15 \quad (8)$$

$$0.85 < |\varphi 12TX/(\varphi 12TY)| < 1.15 \quad (9)$$

where φ12WX is the combined axial refractive power of the pair of freeform lenses, of the first lens group, along an X-axis of the lens system, perpendicular to the Y-axis and the optical axis Z of the lens system, in a maximum wide-angle state of the lens system; φ12WY is the combined axial refractive power of the pair of lenses of the first lens group along the Y-axis in the maximum wide-angle state; φ12TX is the combined axial refractive power of the pair of lenses of the first lens group along the X-axis in a maximum telephoto state of the lens system; and φ12TY is the combined axial refractive power of the pair of lenses of the first lens group along the Y-axis in the maximum telephoto state of the lens system.

Additionally, in certain examples, the following conditional expressions should be satisfied to obtain high optical performance and, at the same time, minimize the lens size:

$$0.2 < |\Delta LA|/ft < 0.85 \quad (10)$$

$$0.2 < |\Delta LB|/ft < 0.85 \quad (11)$$

wherein ΔLA is the movement of the first lens of the pair of lenses of the first lens group along the Y-axis when the lens system changes from a maximum wide-angle state to a maximum telephoto state, ΔLB is the movement of the second lens of the pair of lenses of the first lens group along the Y-axis when the lens system changes from the maximum wide-angle state to the maximum telephoto state, and ft is the focal length of the lens system in the maximum telephoto state.

The conditional expressions (10) and (11) are used in order to define the shift amount of the first and second free-form lenses of the first lens group. The focal length ft in the conditional expressions (10) and (11) can also be rewritten as fw×Z, where fw is the focal length at the maximum wide angle position of the variable focal length lens system and Z is the zoom ratio of the lens system (between the maximum telephoto lens sate and the maximum wide angle lens state).

At the focal length fw, the lens system is in general at its most compact initial position of the zoom range, thus it is used within the conditions to normalize the movement of the free-form lenses to this position. Finally, the conditional expressions (10) and (11) are used to define the relation of the shift amount of the free-form lenses to the zoom ratio Z.

If the upper limit of the conditional expressions (10) and (11) is exceeded, the movement of the free-form lenses becomes large and, in consequence, the overall lens size in the Y-direction becomes large. Conditional expressions (10) and (11) therefore enable a further reduction in the form factor of the variable focal lens system of the present disclosure.

In order to zoom, from a telephoto state of the lens system to a wide angle state of the lens system, the first and second free-form lenses of the first lens group are moved gradually (smoothly) along the Y-axis of the system. This results in a combined change in the refractive power of the lens system (changing the focal length of the lens system). The change in the focal length shifts the ray flux in the first and second free-form lens. To reduce the introduction of field-dependent aberrations, the angle between the optical axis Z1 and the principal ray should be narrow, which means that the free-form lenses should, preferentially, be positioned close to the aperture stop or one of its images, the entrance, or exit pupil of the lens system.

Additional Modifications

The lens material used to construct the lenses of the lens system (including the lens material used to construct the first and second free-form lenses) is not particularly limited. For example, in some situations, the lenses may be formed from plastic materials. In other examples, the lenses may be formed from glass materials. In fact, the use of glass materials may be particularly advantageous, since the use of glass materials reduces chromatic aberrations of the lens system.

Alternatively, or in addition, a diffractive optical element may be incorporated within the lens system in order to compensate for chromatic aberrations of the system. The position of the diffractive optical element along the optical axis of the lens system is not particularly limited.

Furthermore, in certain examples, an optical low pass filter may be arranged between the lens system (including the first and second lens group) and the image sensor to avoid moire. An infrared cut filter, or the like, may also be used to optimize the sensitivity of the image sensor.

In accordance with embodiments of the disclosure, the first lens group G1 is moveable in a direction perpendicular to the optical axis of the lens system (that is, moveable along the Y-axis of the lens system). Likewise, the second lens group G2 is moveable in a direction parallel to the optical axis of the lens system (that is, moveable along the Z-axis). A drive system may therefore be included in the lens system in order to drive the movement of the first and second lens group. The drive system gives a drive amount to shift the lenses based, at least in part, on the lens position information. The drive system may also give a drive amount to shift the lenses based on a user input or instruction. In some examples, the lenses may be shifted by a motor—however, any suitable means of moving the position of the lenses (including manual operation) may be used in accordance with embodiments of the disclosure as required.

When used in an image capture device, the lens system may also be combined with a detection system and an arithmetic system, to function as a vibration reduction system, which corrects image blurring due to camera shake or the like generated at the time of shutter release. In this case, the detection system detects a shake angle of the camera and outputs camera shake information. The drive system may then shift the lenses of the first and second lens group in order to compensate for the camera shake and reduce image blurring.

Imaging Device

Figure 3:
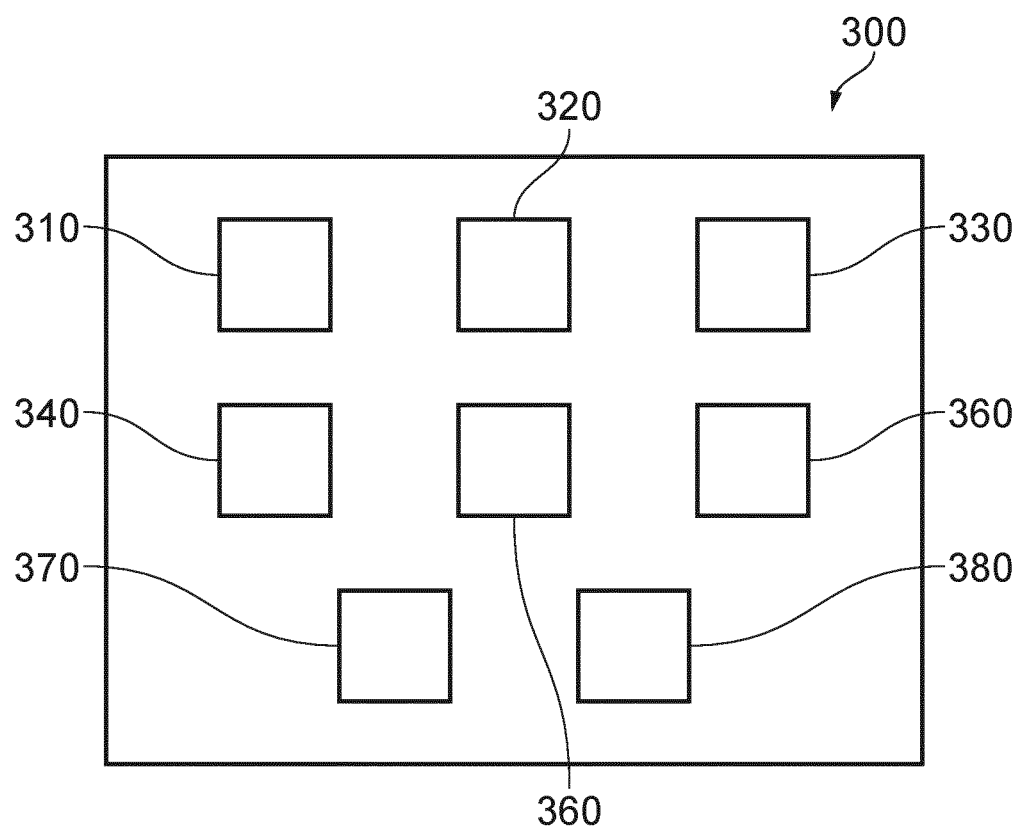
FIG. 3 illustrates the configuration of an imaging apparatus to which the lens system according to embodiments of the disclosure may be applied.

As noted above, the lens system 100 of the present disclosure may be applied to an imaging device, such as an image capture device. FIG. 3 illustrates an example configuration of an imaging device 300 to which the lens system 100 of the present disclosure may be applied. Typically, the imaging device 300 is a digital still camera. Alternatively, the imaging device 300 is a digital camera for the capture of video. The lens system 100 of the present disclosure may also be applied to other imaging devices such as digital single-lens reflex cameras, digital non-reflex cameras, digital video cameras, surveillances cameras (including CCTV camera systems) or the like.

Additionally, the lens system 100 can be applied as a camera unit of a digital input/output device, or can be provided to an interchangeable lens system. For example, lens system 100 may be incorporated within a portable electronic device (such as a mobile phone, laptop computer, tablet computing device or the like).

The imaging device 300 includes a camera, or image capture, unit 310, a camera signal processing unit 320, an image signal processing unit 330, a display unit 340, a storage unit 350, a central processing unit 360, an input unit 370 and a lens drive control unit 380.

The camera unit 310 is configured to perform an imaging function. The camera unit 310 may include an optical system (including an imaging lens 301 and an imaging element 302). The imaging element 302 may be a charge coupled device (CCD) or a complementary metal oxide semiconductor (CMOS). The imaging element is configured to output an imaging signal (image signal) corresponding to the optical image produced by the imaging lens 301 into an electrical signal. The imaging lens may include the variable focal length lens system 100.

The signal processing unit 320 performs various signal processing, such as analog-to-digital conversion, noise reduction, image quality correction, conversion to luminance and colour difference signals and the like, on the image signal output by the imaging element 302.

The image processing unit 330 performs recording/reproduction processing of an image signal (output by the signal processing unit 320). Furthermore, in certain examples, the image processing unit 330 may perform compression encoding and/or expansion decoding processing of an image signal based on a predetermined image data format, conversion processing of data specifications such as resolution and the like.

The display unit 340 may be configured to perform the function of displaying data, such as an operation state of the user on the input unit 370 and/or a photographed image. In certain examples, the display unit is a liquid crystal display (LCD). That is, the display unit 340 may be a monitor or some kind of device allowing the user to visualise the operation of the system and/or images captured by the system. While shown integrated within the imaging device 300, the display unit 340 may, alternatively, be external to the imaging device 300. In this case, the display unit 340 may be a printer, projector or some other device allowing display of the images captured by the imaging device 300.

The storage unit 350 writes the image data encoded by the image processing unit 330 to a memory and reads the image data recorded from the memory as required. In some examples, the memory may be a memory card, such as a semiconductor memory that can be attached to and detached from the imaging device 300 by the user. In fact, the storage unit 350 may include a magnetically readable medium, optically readable medium or solid state type circuitry. The storage unit 350 may be integrated into the imaging device 300 or may be separate to the imaging device 300 and connected thereto using either a wired or wireless connection.

The central processing unit 360 is configured to perform functions, which control the operation of the units of the imaging device 300. The central processing unit 360 may control the operations of the device under the instructions of the user received from the input unit 370. The central processing unit 360 may be a microprocessor carrying out computer instructions or may be an Application Specific Integrated Circuit. The computer instructions may be stored on a storage medium, or storage unit 350. The computer instructions may be embodied as computer software that contains computer readable code which, when loaded onto the central processing circuitry 360, configures the central processing circuitry 360 to perform a method according to embodiments of the disclosure.

The input unit 370 may include a number of buttons and/or switches, which enable the user to control the operations of the imaging device. The input unit includes, for example, a shutter release button for performing a shutter operation, a selection switch for selecting an operation mode and the like. Alternatively, the input unit 370 may be a touch screen or may be a mouse or stylist type input device. The input unit 370 may also be a keyboard, a virtual keyboard, or any combination of these devices. As such, the input unit 370 outputs an instruction input signal, according to an operation performed by the user, to the central processing unit 360, for controlling the operation of the imaging device 300.

Finally, the lens drive control unit 380 controls the drive of the lens disposed in the camera unit 310. In certain examples, the lens drive control unit 380 may control a motor (not shown) that drives each lens of the imaging lens 301 based on a control signal output by the central processing unit 360.

In an example operation, the imaging device 300 may be in a photographing standby state. In this state, under the control of the central processing unit 360, an image signal photographed in the camera unit 310 is output to the display unit 340 via the camera signal processing unit 320 and displayed as a camera through image. For example, when an instruction input signal for zooming or focusing is input from the input unit 370, the central processing unit 360 outputs a control signal to the lens drive control unit 380 and the imaging lens 301, which may include the lens system 100, is moved based on the control of the lens drive control unit 380.

When the shutter (not shown) of the camera unit 310 is operated by an instruction input signal from the input unit 370 (received by a user operation of the input unit 370) the photographed image signal is output from the camera signal processing unit 320 to the image processing unit 330, and compression encoding processing is performed. That is, the image signal output from the camera signal processing unit 320 is converted by the image processing unit 330 into digital data in a specified or predetermined digital data format. The converted data is output to the storage unit 350 and stored in memory.

In certain examples, image focusing may be performed when the shutter release button of the imaging device 300 is half-pressed or fully pressed by the user for recording (or shooting) an image. The focusing is performed, under the control of the central processing unit 360, by movement of a predetermined lens of the imaging lens 301.

When reproducing image data recorded in the memory, the specified image data is read from the memory in response to an operation of the input unit 370, and the image processing unit 330 decompresses and decodes the image data. After the processing, the reproduced image signal is output to the display unit 340 and the reproduced image is displayed to the user.

Of course, it will be appreciated that the operation of the imaging device 300 is not limited to this example of the photographing standby state. Many other states, mode and operations of the imaging device 300 can be performed as desired.

Specific Numerical Examples

Next, specific numerical examples of the variable focal length lens system 100, including specific examples of the freeform lenses, are described. However, it will be appreciated that the embodiments of the disclosure are not intended to be limited to these specific examples.

In these examples, the surface number indicates the number of the surface counter from the object side to the image surface side. The radius of curvature indicates the value (mm) of the radius of curvature of the i-th surface. Spacing is the axial surface distance between the i-th surface and the i+1-th surface (the thickness of the centre of the lens or the air gap value (mm) is indicated). Refractive index indicates the value of the refractive index at e-line (wavelength 546 nm) of a lens or the like starting from the i-th surface. The Abbe number indicates the value for the Abbe number at the e-line of a lens or the like starting from the i-th surface. Further, the surface shape indicates types of surface shapes of the respective lens surfaces. Moreover, in each table, E-n represents an exponential expression with a base of 10.

Figure 4A:
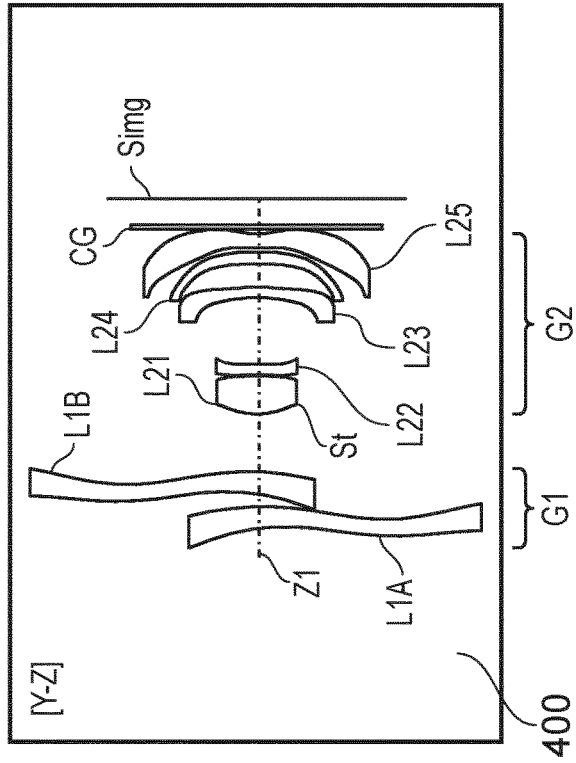
FIG. 4A illustrates specific example of a lens system in a YZ plane in accordance with embodiments of the disclosure.
Figure 5A:
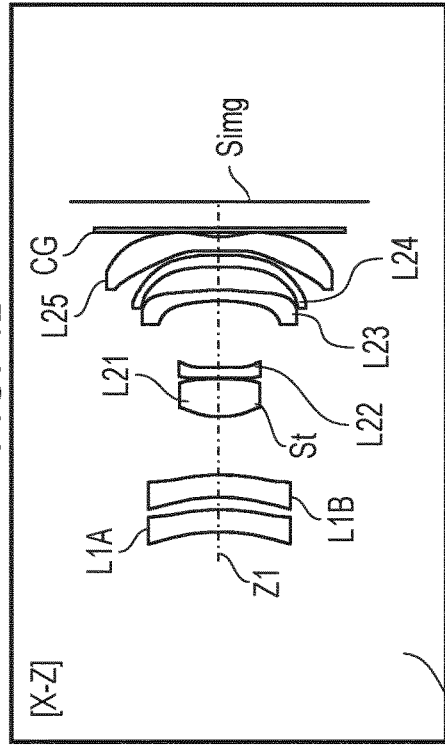
FIG. 5A illustrates a specific example of a lens system in an XZ plane in accordance with embodiments of the disclosure.
Figure 4B:
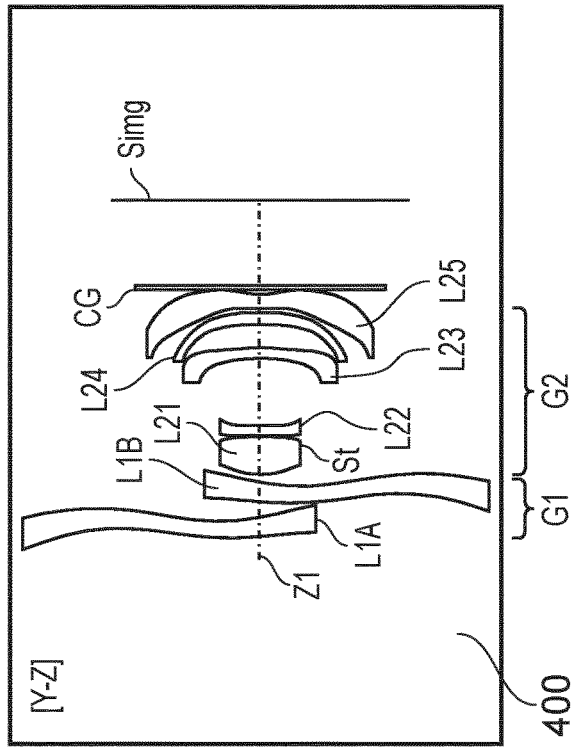
FIG. 4B illustrates specific example of a lens system in a YZ plane in accordance with embodiments of the disclosure.
Figure 5B:
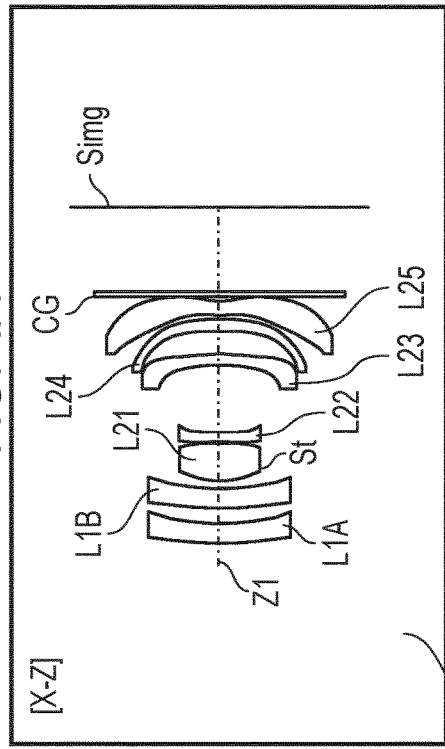
FIG. 5B illustrates a specific example of a lens system in an XZ plane in accordance with embodiments of the disclosure.

FIGS. 5A and 5B illustrate the lens system 400 in the X-Z plane in the same telephoto state and wide-angle state as illustrated in FIGS. 4A and 4B respectively.

In the lens system 400, a first and second lens group G1 and G2 are shown. The first lens group, G1, includes a first lens L1A and a second lens L1B. Each of the first lens L1A and the second lens L1B are free-form lenses (that is, lenses with a free-form (polynomial) surface). As described above, in certain examples according to embodiments of the disclosure, the shape of the second free-form lens L1B of the first lens group G1 is chosen to have the same shape as the first free-form lens of the lens system (but is arranged oppositely (rotated by 180 degrees) about the Z-axis to the first free-form lens L1A. The second lens group, include a number of aspherical (rotationally symmetric) lenses.

Table 1 shows the basic lens data for the lenses of lens system 400 of Numerical Example 1 of the present disclosure. In this example, the lens surfaces 1 to 4 (of the free-form lenses) are defined by an XY Polynomial. Each of the lens surfaces 6 to 15 are aspherical surfaces (while the 16 and 17 surfaces are spherical). An aperture stop St, is also provided in the second lens group, G2.

TABLE 1

Basic lens data for the lenses of Numerical Example 1 of the present disclosure.

| Surface # | Surface type | Radius of curvature | Thickness | Glass | Refractive index | Abbe number |
|---|---|---|---|---|---|---|
| Object surface | | | | | | |
| 1 (AL1) | XY Polynomial | 30.1902 | 0.4000 | 'ZEOK26R' | 1.5366 | 35.775 |
| 2 | XY Polynomial | 37.5703 | 0.4400 | | | |
| 3 (AL2) | XY Polynomial | 30.1902 | 0.4000 | 'ZEOK26R' | 1.5366 | 35.775 |
| 4 | XY Polynomial | 37.5703 | 0.3500 | | | |
| 5 - Stop | Sphere | Infinity | $-0.2000^Z$ | | | |
| 6 - L1 | Asphere | 1.7908 | 0.9079 | 'ZEOK26R' | 1.5366 | 35.775 |
| 7 | Asphere | -16.0361 | 0.0315 | | | |
| 8 - L2 | Asphere | -7.1796 | 0.2500 | 'EP10000' | 1.6890 | 11.168 |
| 9 | Asphere | -22.6327 | 1.6229 | | | |
| 10 - L3 | Asphere | -3.4720 | 0.2500 | 'APL5014C' | 1.5455 | 36.128 |
| 11 | Asphere | -6.7348 | 0.5533 | | | |
| 12 - L4 | Asphere | 9.2975 | 0.2898 | 'EP10000' | 1.6890 | 11.168 |
| 13 | Asphere | -43.0186 | 0.1 | | | |
| 14 - L5 | Asphere | 5.2927 | 0.3400 | 'APL5014C' | 1.5455 | 36.128 |
| 15 | Asphere | 1.3560 | 0.1080 | | | |
| 16 | Sphere | Infinity | 0.1100 | 512000.5690 | | |
| 17 | Sphere | Infinity | $2.0467^Z$ | | | |
| Image plane | Sphere | Infinity | 0.0000 | | | |

Numerical Example 1

An example configuration of a lens system 400 in accordance with embodiments of the disclosure, illustrated in a Y-Z plane, is shown in FIGS. 4A and 4B. In this example, the Z-axis is defined as the axis along the optical axis of the lens system. The Y-axis is defined as the axis perpendicular to this axis (and is the axis along which the free-lenses move in order to change the focal length of the lens system). The X-axis is the axis perpendicular to both the Z-axis and the Y-axis.

FIG. 4A shows the lens system 400 in a telephoto lens state, while FIG. 4B shows the lens system 400 in a wide-angle lens state.

Now, as noted above, FIG. 4A shows the lens system 400 in a telephoto state. In contrast, FIG. 4B shows the lens system 400 in a wide-angle state. As can be seen from the relative movement of the lens system 400 between the wide-angle state and the telephoto state, the lenses of the first lens group (G1) are moveable along the Y-axis (being the axis perpendicular to the optical axis (the Z-axis) of the lens system 400). In contrast, the second lens group (G2) is moveable along the Z-axis of the lens system.

In this regard, the change of the lens data in accordance with the change of the focal length of the lens system is shown in Table 2 of the present disclosure.

TABLE 2

Change of lens data with focal length for Numerical Example 1 of the present disclosure.

| Surface # | Parameter | Position 1 (telephoto end, f = 8.493 mm) | Position 2 (middle, f = 7.00 mm) | Position 3 (middle, f = 6.00 mm) | Position 4 (wide angle end, f = 4.509 mm) |
|---|---|---|---|---|---|
| 5 (Stop) | Thickness | −0.2000 | 0.2849 | 0.6773 | 1.2166 |
| 17 | Thickness | 2.0467 | 1.5617 | 1.1694 | 0.6300 |
| 1-2 (AL1) | y-shift | 2.2779 | 0.5934 | −0.3314 | −1.7703 |
| 3-4 (AL2) | y-shift | −2.2659 | −0.7893 | 0.0668 | 1.8093 |

As can be seen in FIGS. 5A and 5B of the disclosure (viewed in the X-Z plane), the change of Y position of the first lens L1A and the second lens L1B of the first lens group results in a change of the shape of the lens (of the first lens L1A and the second lens L1B) being presented along the optical axis (Z-axis) of the lens system. This change in shape varies the combined refractive power of the first and second lens of the first lens group, resulting in the change of the focal length of the lens system.

In contrast, the movement of the second lens group along the X-axis is provided in order to compensate for the change in refractive power of the lens system 400 when changing from the wide-angle state to the telephoto state in order to keep the image plane in a fixed position along the optical axis of the lens system.

In this example, the smoothly varying free-form surfaces of the first and second lenses of the first lens group G1 are described by an XY polynomial (see Equation 1 of the present disclosure). The values for the coefficients of the XY polynomial in this specific example are provided in Table 3 of the present disclosure.

TABLE 3

Values of the XY polynomial coefficients for the first and second free-form lens for Numerical Example 1 of the present disclosure.

| Surface # | Surface coefficients |
|---|---|
| 1 | K: −1.2000E+01 Y: 1.3598E−01 X2: −2.2494E−02 Y2: −3.1858E−02 X2Y: −7.7573E−02 Y3: −3.4080E−02 X4: −6.0225E−03 X2Y2: −4.4682E−03 Y4: 2.3451E−04 X4Y: 5.7906E−03 X2Y3: 8.6955E−03 Y5: 2.5313E−03 X6: 3.1306E−03 X4Y2: 1.1789E−03 X2Y4: −8.8489E−05 Y6: −4.9619E−05 X6Y: −9.1373E−04 X4Y3: −3.3768E−04 X2Y5: −4.6819E−04 Y7: −1.2524E−04 X8: −1.9777E−03 X6Y2: −6.5003E−04 X4Y4: −1.0436E−04 X2Y6: 1.7274E−05 Y8: −1.6951E−07 X8Y: 1.6475E−04 X6Y3: 1.2207E−05 X4Y5: −2.4581E−06 X2Y7: 9.4841E−06 Y9: 2.9577E−06 X10: 4.0109E−04 X8Y2: 1.8245E−04 X6Y4: 2.4652E−05 X4Y6: 3.8420E−06 X2Y8: −1.3928E−07 Y10: 6.4627E−08 |
| 2 | K: −1.2000E+01 Y: 1.6985E−01 X2: 5.4838E−03 Y2: −4.6824E−03 X2Y: −8.2684E−02 Y3: −3.5518E−02 X4: −7.9245E−03 X2Y2: −3.8540E−03 Y4: 7.3286E−04 X4Y: 6.5424E−03 X2Y3: 9.3084E−03 Y5: 2.4727E−03 X6: 6.7171E−03 X4Y2: 2.1035E−03 X2Y4: 7.5842E−06 Y6: −1.4149E−04 X6Y: −2.0474E−03 X4Y3: −1.3784E−04 X2Y5: −4.7083E−04 Y7: −1.0851E−04 X8: −4.8431E−03 X6Y2: −1.6800E−03 X4Y4: −2.1644E−04 X2Y6: −1.3383E−05 Y8: 8.7595E−06 X8Y: 5.5279E−04 X6Y3: 2.1562E−05 X4Y5: −3.1471E−05 X2Y7: 7.5103E−06 Y9: 2.1296E−06 X10: 1.1223E−03 X8Y2: 5.0837E−04 X6Y4: 8.1395E−05 X4Y6: 6.8695E−06 X2Y8: 1.7583E−06 Y10: −2.9636E−07 |
| 3 | K: −1.2000E+01 Y: −1.3598E−01 X2: −2.2494E−02 Y2: −3.1858E−02 X2Y: 7.7573E−02 Y3: 3.4080E−02 X4: −6.0225E−03 X2Y2: −4.4682E−03 Y4: 2.3451E−04 X4Y: −5.7906E−03 X2Y3: −8.6955E−03 Y5: −2.5313E−03 X6: 3.1306E−03 X4Y2: 1.1789E−03 X2Y4: −8.8489E−05 Y6: −4.9619E−05 X6Y: 9.1373E−04 X4Y3: 3.3768E−04 X2Y5: 4.6819E−04 Y7: 1.2524E−04 X8: −1.9777E−03 X6Y2: −6.5003E−04 X4Y4: −1.0436E−04 X2Y6: 1.7274E−05 Y8: −1.6951E−07 X8Y: −1.6475E−04 X6Y3: −1.2207E−05 X4Y5: 2.4581E−06 X2Y7: −9.4841E−06 Y9: −2.9577E−06 X10: 4.0109E−04 X8Y2: 1.8245E−04 X6Y4: 2.4652E−05 X4Y6: 3.8420E−06 X2Y8: −1.3928E−07 Y10: 6.4627E−08 |
| 4 | K: −1.2000E+01 Y: −1.6985E−01 X2: 5.4838E−03 Y2: −4.6824E−03 X2Y: 8.2684E−02 Y3: 3.5518E−02 X4: −7.9245E−03 X2Y2: −3.8540E−03 Y4: 7.3286E−04 X4Y: −6.5424E−03 X2Y3: −9.3084E−03 Y5: −2.4727E−03 X6: 6.7171E−03 X4Y2: 2.1035E−03 X2Y4: 7.5842E−06 Y6: −1.4149E−04 X6Y: 2.0474E−03 X4Y3: 1.3784E−04 X2Y5: 4.7083E−04 Y7: 1.0851E−04 X8: −4.8431E−03 X6Y2: −1.6800E−03 X4Y4: −2.1644E−04 X2Y6: −1.3383E−05 Y8: 8.7595E−06 X8Y: −5.5279E−04 X6Y3: −2.1562E−05 X4Y5: 3.1471E−05 X2Y7: −7.5103E−06 Y9: −2.1296E−06 X10: 1.1223E−03 X8Y2: 5.0837E−04 X6Y4: 8.1395E−05 X4Y6: 6.8695E−06 X2Y8: 1.7583E−06 Y10: −2.9636E−07 |

Furthermore, as noted above, in this specific example (Numerical Example 1), the lens surfaces 6 to 15 of lens system 500 are aspherical surfaces. These aspherical surfaces, in this example, are defined by Equation 3 of the present disclosure. Accordingly, numerical values for the aspherical coefficients of these lenses are provided in Table 4 of the present disclosure.

TABLE 4

Values of the aspherical coefficients for the lenses of the second lens group for Numerical Example 1 of the present disclosure.

| Surface # | Surface coefficients |
|---|---|
| 6 | K: −3.441286<br>A: 0.519801E−01 B: −.382580E−01 C: 0.802490E−03 D: −.147652E−02 E: −.103311E−01 |
| 7 | K: 12.000000<br>A: −.934664E−01 B: 0.674646E−01 C: −.638920E−01 D: −.325039E−01 E: 0.536855E−01 F: −.178718E−01 |
| 8 | K: −12.000000<br>A: 0.853127E−01 B: 0.503846E−01 C: 0.593605E−01 D: −.227072E+00 E: 0.216321E+00 F: −.855683E−01 G: 0.120380E−01 |
| 9 | K: 12.000000<br>A: 0.159637E+00 B: 0.533841E−01 C: −.505869E−01 D: 0.120291E+00 E: −.180841E+00 F: 0.136458E+00 G: −.401607E−01 |
| 10 | K: 4.579410<br>A: 0.753045E−01 B: −.164055E+00 C: 0.339816E+00 D: −.355302E+00 E: 0.174853E+00 F: −.380376E−01 G: 0.243692E−02 |
| 11 | K: 12.000000<br>A: −.693926E−01 B: 0.177617E+00 C: −.100720E+00 D: 0.884713E−03 E: 0.157767E−01 F: −.477343E−02 G: 0.423617E−03 |
| 12 | K: −11.999974<br>A: −.427522E+00 B: 0.594476E+00 C: −.451452E+00 D: 0.173696E+00 E: −.302874E−01 F: 0.393338E−02 G: −.298685E−02 H: 0.113670E−02 J: −.133579E−03 |
| 13 | K: −12.000000<br>A: −.245733E+00 B: 0.304054E+00 C: −.213174E+00 D: 0.756454E−01 E: −.131310E−01 F: 0.121424E−02 G: −.287590E−03 H: 0.813237E−04 J: −.754212E−05 |
| 14 | K: −12.000000<br>A: −.302765E+00 B: 0.184441E+00 C: −.673866E−01 D: 0.175947E−01 E: −.347101E−02 F: 0.482965E−03 G: −.412945E−04 H: 0.181182E−05 J: −.304841E−07 |
| 15 | K: −12.000000<br>A: −.155546E+00 B: 0.751644E−01 C: −.193035E−01 D: 0.269275E−02 E: −.235786E−03 F: 0.200340E−04 G: −.192075E−05 H: 0.115526E−06 J: −.293438E−08 |

Figure 6A:
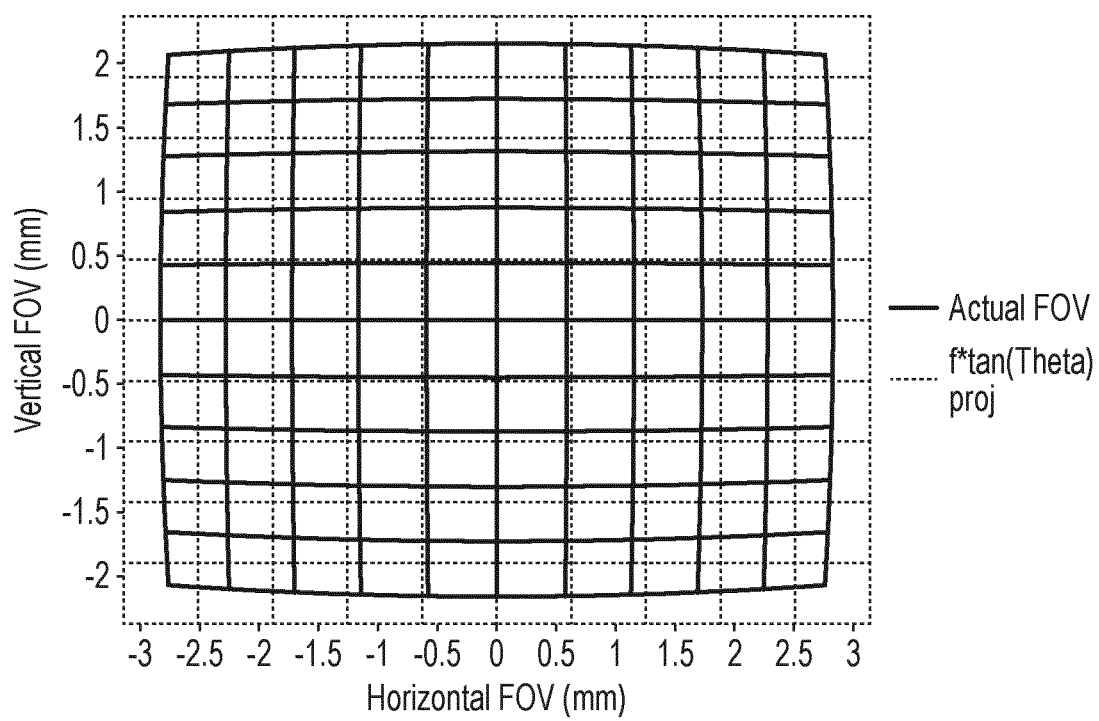
FIG. 6A shows a spot diagram produced by an example lens system in a telephoto state in accordance with embodiments of the disclosure.
Figure 6B:
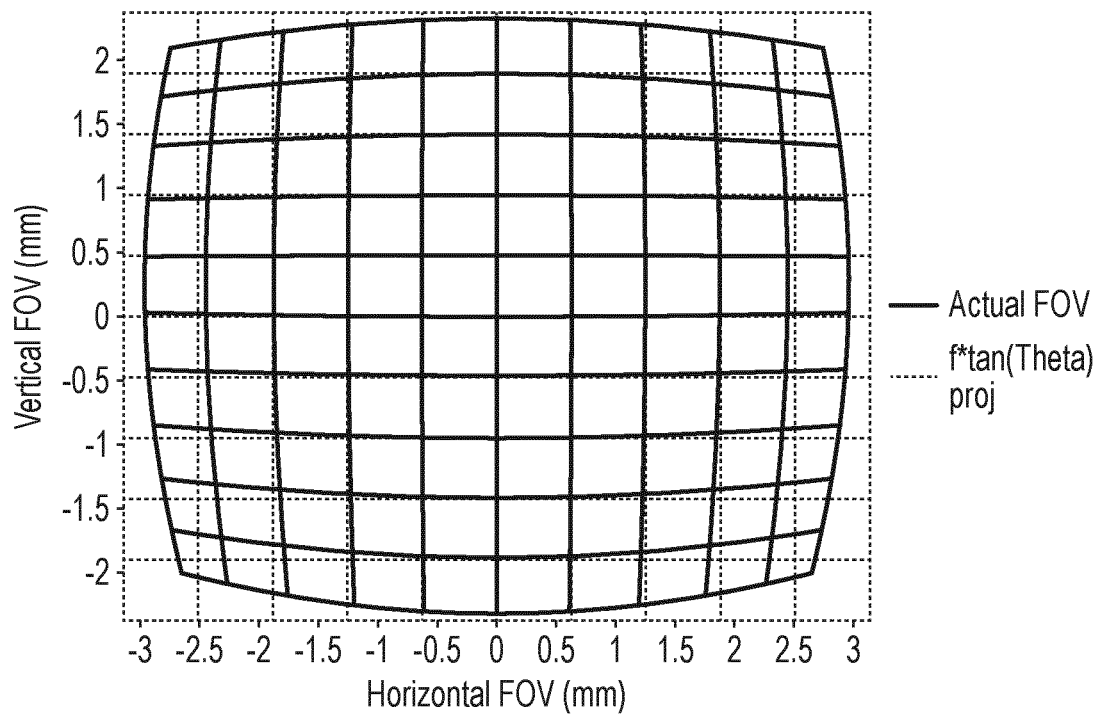
FIG. 6B shows a spot diagram produced by an example lens system in a wide-angle state in accordance with embodiments of the disclosure.

FIG. 6A shows the distortion of the lens system 400 of this example in a maximum telephoto state. FIG. 6B, however, shows the distortion of the lens system 400 of this example in a maximum wide-angle state.

Figure 7A:
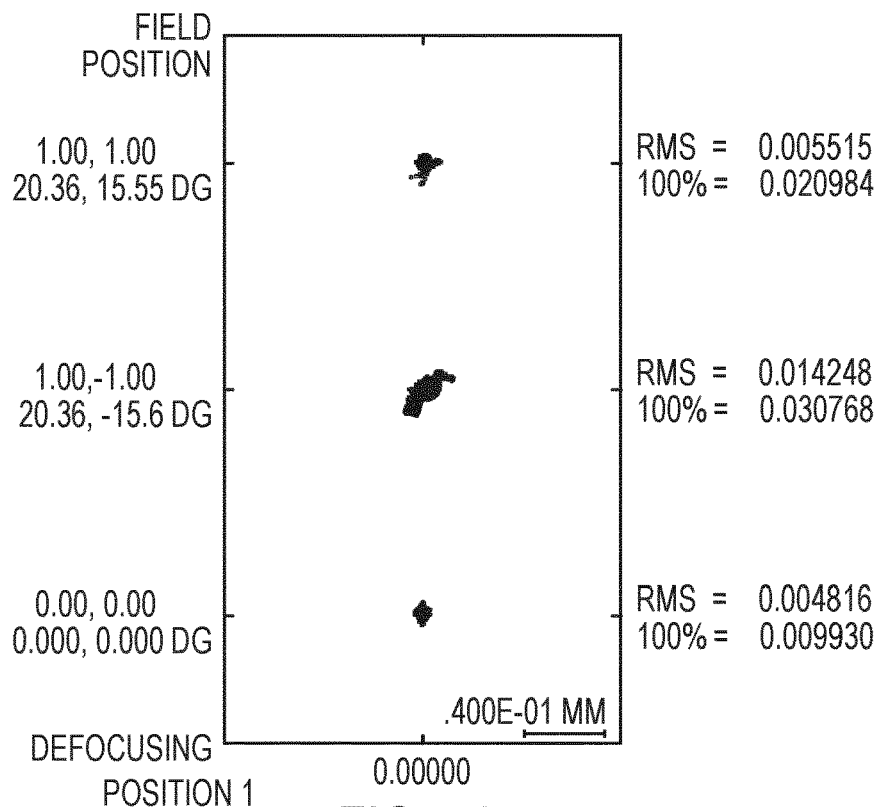
FIG. 7A shows a spot diagram produced by an example lens system in a telephoto state in accordance with embodiments of the disclosure.
Figure 7B:
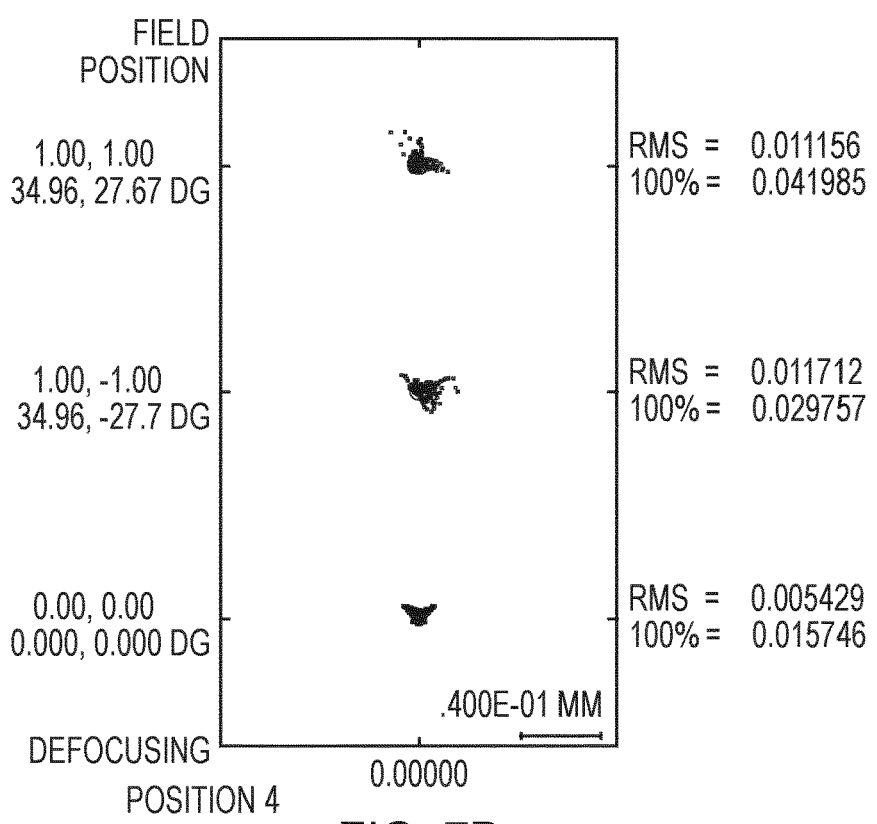
FIG. 7B shows a spot diagram produced by an example lens system in a wide-angle state in accordance with embodiments of the disclosure.
Figure 8A:
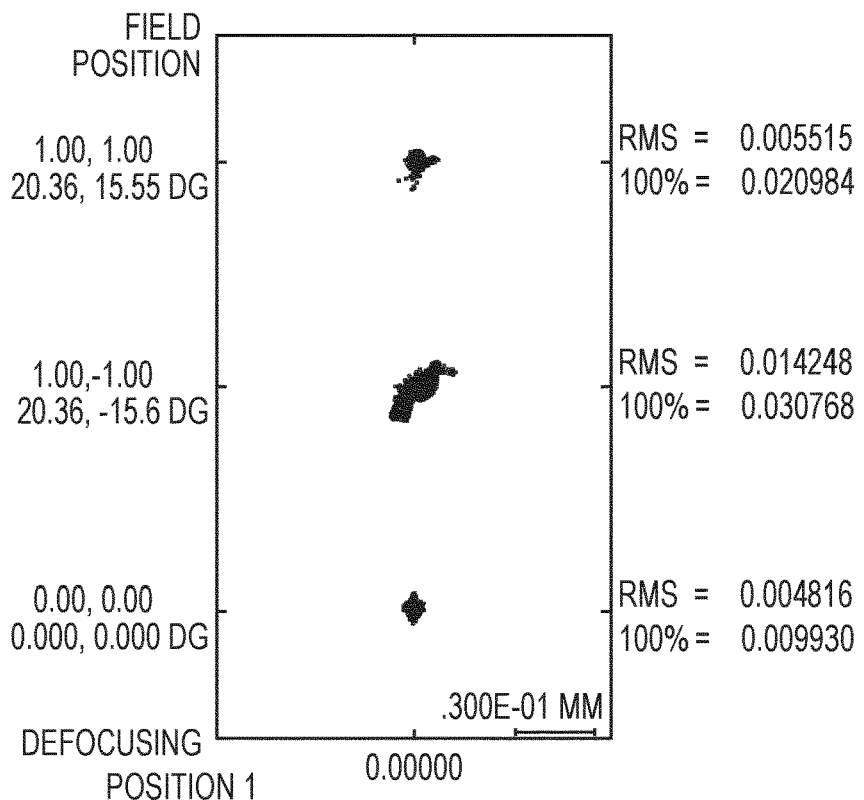
FIG. 8A shows distortion for an example lens system in a telephoto state in accordance with embodiments of the disclosure.
Figure 8B:
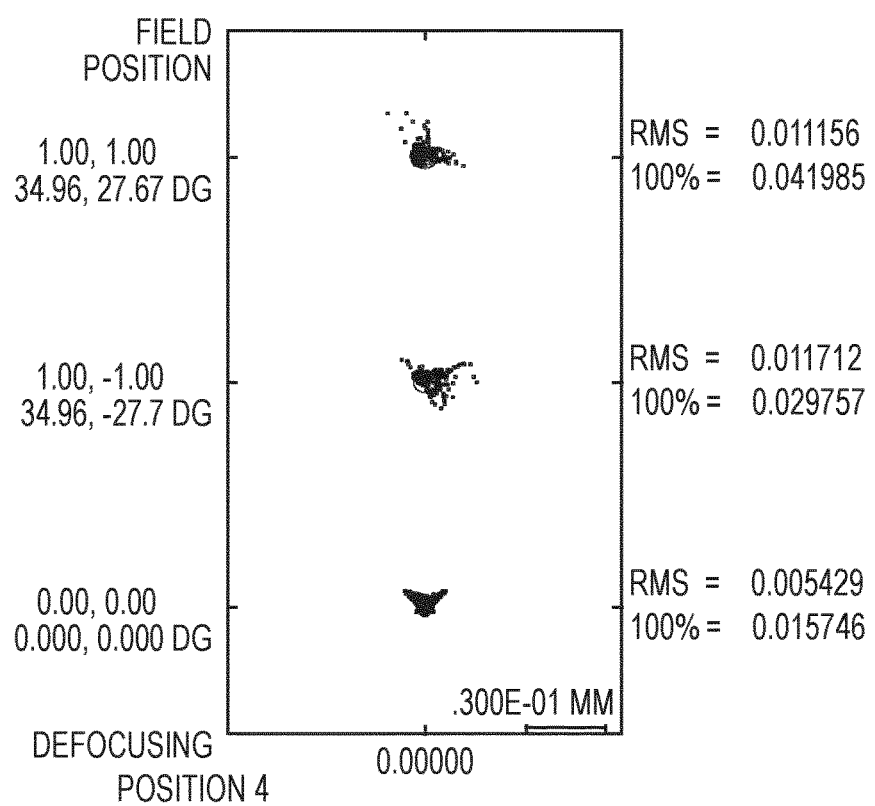
FIG. 8B shows distortion for an example lens system in a wide-angle state in accordance with embodiments of the disclosure.

FIGS. 7A and 7B show spot diagrams in the maximum telephoto state and wide-angle state, respectively, at a scale of 0.04 mm. In contrast, FIGS. 8A and 8B show spot diagrams in the maximum telephoto state and wide-angle state, respectively, at a scale of 0.03 mm.

From these Figures, it can be seen that the lens system 400 of this numerical example achieves good imaging performance in both the wide-angle and telephoto state.

Furthermore, lens system 400, of the present example, achieves the following values for the conditional expressions of Equations (4) to (11) of the present disclosure:

$|\varphi 12W| \cdot fw = 0.161$ $|\varphi 12W| \cdot ft = 0.569$ $|\varphi 12WX - \varphi 12WY| \cdot fw = 0.00013$ $|\varphi 12TX - \varphi 12TY| \cdot ft = 0.00003$ $|\varphi 12WX / \varphi 12WY| = 0.9842$ $|\varphi 12TX / \varphi 12TY| = 0.9963$ $|\Delta LA| / ft = 0.536$ $|\Delta LB| / ft = 0.48$ Each of these values is within the range of the respective conditional expression, thus ensuring the imaging performance of the lens system 400.

Numerical Example 2

Figure 9A:
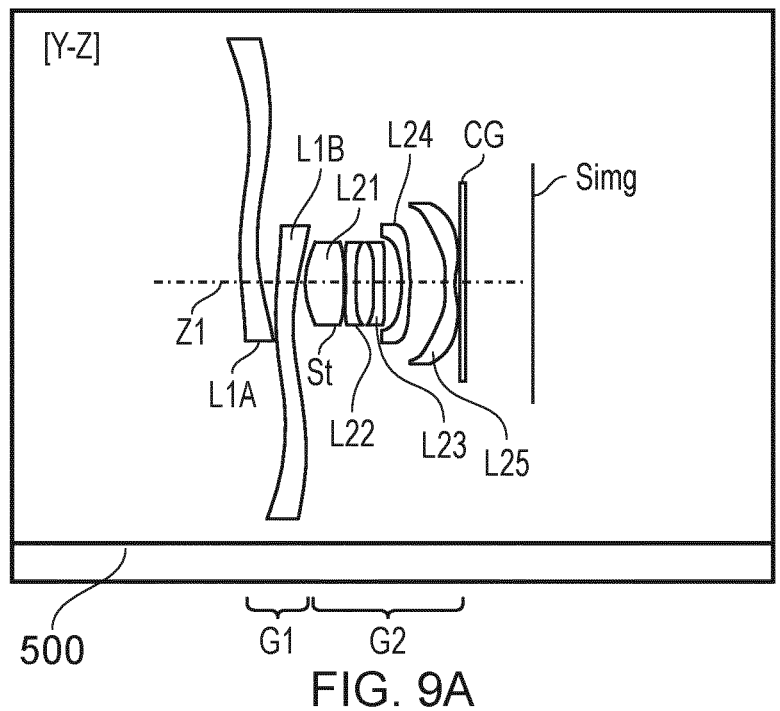
FIG. 9A illustrates a specific example of a lens system in a YZ plane in accordance with embodiments of the disclosure.
Figure 9B:
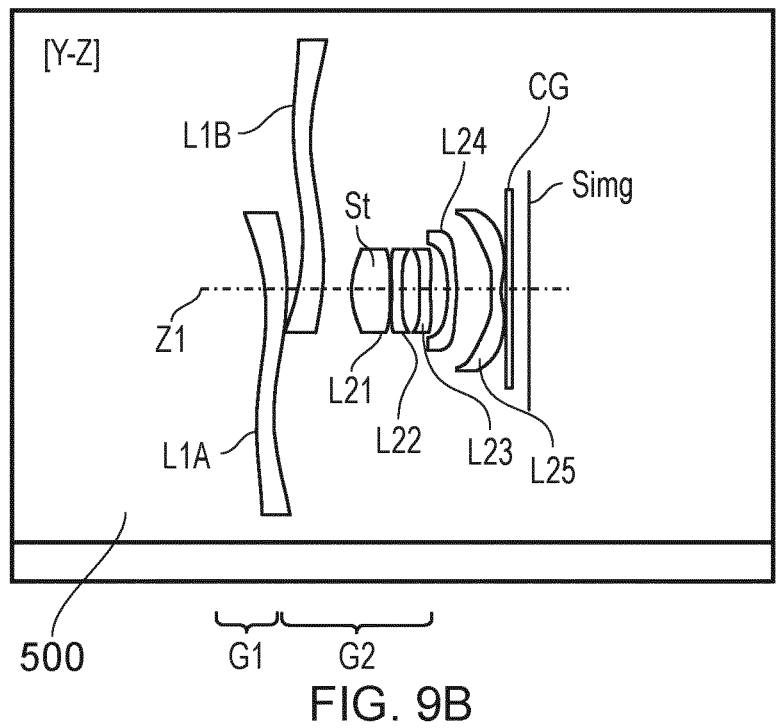
FIG. 9B illustrates a specific example of a lens system in a YZ plane in accordance with embodiments of the disclosure.

An example configuration of a lens system 500 in accordance with embodiments of the disclosure, illustrated in a Y-Z plane, is shown in FIGS. 9A and 9B. In this example, the Z-axis is defined as the axis along the optical axis of the lens system. The Y-axis is defined as the axis perpendicular to this axis (and is the axis along which the free-lenses move in order to change the focal length of the lens system). The X-axis is the axis perpendicular to both the Z-axis and the Y-axis.

FIG. 9A shows the lens system 500 in a telephoto state, while FIG. 9B shows the lens system 500 in a wide-angle lens state.

Figure 10A:
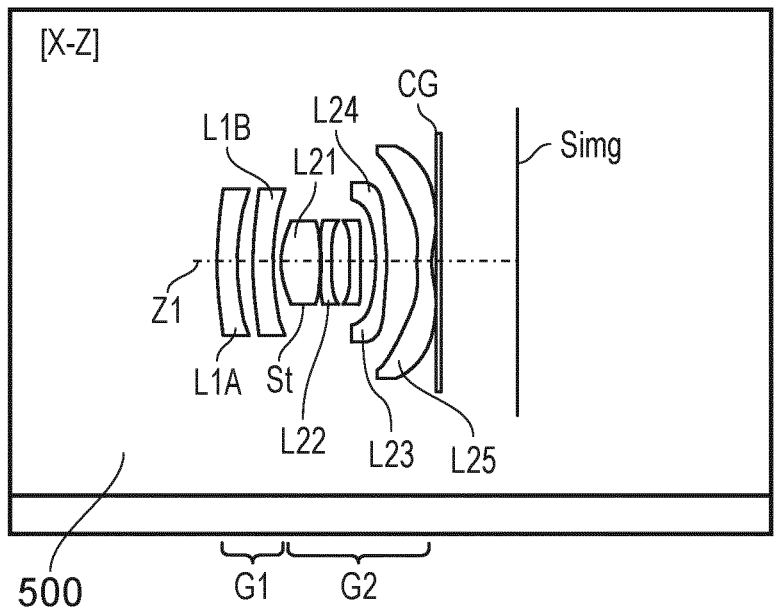
FIG. 10A illustrates a specific example of a lens system in an XZ in accordance with embodiments of the disclosure.
Figure 10B:
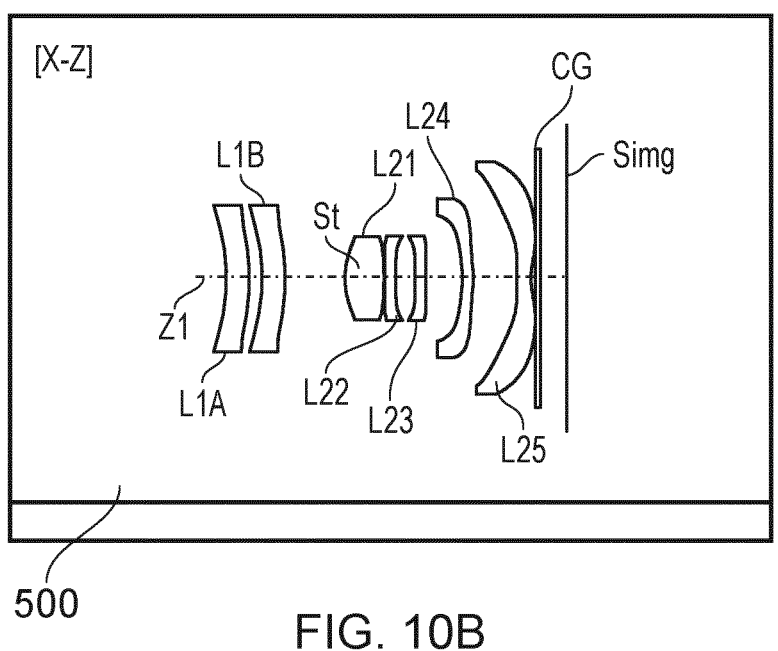
FIG. 10B illustrates a specific example of a lens system in an XZ in accordance with embodiments of the disclosure.

FIGS. 10A and 10B illustrate the lens system 500 in the X-Z plane in the same telephoto lens state and wide-angle lens state as illustrated in FIGS. 9A and 9B respectively.

In the lens system 500, a first and second lens group G1 and G2 are shown. The first lens group, G1, includes a first lens L1A and a second lens L1B. Each of the first lens L1A and the second lens L1B are free-form lenses (that is, lenses with a free-form (polynomial) surface). As described above, according to embodiments of the disclosure, the shape of the second free-form lens L1B of the first lens group G1 is chosen to have the same shape as the first free-form lens of the lens system (but is arranged oppositely (rotated by 180 degrees) about the Z-axis to the first free-form lens L1A. The second lens group, include a number of aspherical lenses.

Table 5 shows the basic lens data of the lens system 500 of Numerical Example 2 of the present disclosure. In this example, the lens surfaces 1 to 4 (of the free-form lenses) are defined by a Fringe Zernike polynomial. Each of the lens surfaces 6 to 15 are aspherical surfaces (while the 16 and 17 surfaces are spherical). An aperture stop St, is also provided in the second lens group, G2.

TABLE 5

Basic lens data for Numerical Example 2 of the present disclosure.

| Surface # | Surface type | Radius of curvature | Thickness | Glass | Refractive index | Abbe number |
|---|---|---|---|---|---|---|
| Object surface | | | | | | |
| 1 (AL1) | Fringe Zernike Polynomial | −30.0000 | 0.3695 | 'ZEOK26R' | 1.5366 | 35.775 |
| 2 | Fringe Zernike Polynomial | 135.8416 | 0.4605 | | | |
| 3 (AL2) | Fringe Zernike Polynomial | −30.0000 | 0.3695 | 'ZEOK26R' | 1.5366 | 35.775 |
| 4 | Fringe Zernike Polynomial | 135.8416 | 0.3643 | | | |
| 5 - Stop | Sphere | Infinity | −0.1900$^Z$ | | | |
| 6 - L1 | Asphere | 1.7674 | 1.0437 | 'ZEOK26R' | 1.5366 | 35.775 |
| 7 | Asphere | −9.5132 | 0.0315 | | | |
| 8 - L2 | Asphere | −5.5150 | 0.2500 | 689000.11168 | 1.6890 | 11.168 |
| 9 | Asphere | 108.9183 | 0.5061 | | | |
| 10 - L3 | Asphere | 15.7147 | 0.2500 | 678900.11168 | | |
| 11 | Asphere | −14.9778 | 0.3433 | | | |
| 12 - L4 | Asphere | −3.2240 | 0.2500 | 550343.33265 | | |
| 13 | Asphere | −7.2011 | 1.1077 | | | |
| 14 - L5 | Asphere | 3.7482 | 0.3500 | 'APL5014C' | 1.5455 | 36.128 |
| 15 | Asphere | 1.3526 | 0.0950 | | | |
| 16 | Sphere | Infinity | 0.1100 | 512000.5690 | | |
| 17 | Sphere | Infinity | 2.0390$^Z$ | | | |
| Image plane | Sphere | Infinity | 0.0000 | | | |

Now, as noted above, FIG. 9A shows the lens system 500 in a telephoto state. In contrast, FIG. 9B shows the lens system 500 in a wide-angle state. As can be seen from the relative movement of the lens system 500 between the wide-angle state and the telephoto state, the lenses of the first lens group (G1) are moveable along the Y-axis (being perpendicular to the optical axis (the Z-axis) of the lens system 500). In contrast, the second lens group (G2) is moveable along the Z-axis of the lens system.

In this regard, the change of the lens data in accordance with the change of the focal length of the lens system is shown in Table 6 of the present disclosure.

TABLE 6

Change of lens data with focal length, for Numerical Example 2 of the present disclosure.

| Surface # | Parameter | Position 1 (telephoto end, f = 8.493 mm) | Position 2 (middle, f = 7.00 mm) | Position 3 (middle, f = 6.00 mm) | Position 4 (wide angle end, f = 4.509 mm) |
|---|---|---|---|---|---|
| 5 (Stop) | Thickness | −0.1900 | 0.1549 | 0.6595 | 1.2188 |
| 17 | Thickness | 2.0390 | 1.6939 | 1.1893 | 0.6300 |
| 1-2 (AL1) | y-shift | 3.5718 | 0.7262 | −0.5938 | −1.9683 |
| 3-4 (AL2) | y-shift | −3.6000 | −0.7386 | 0.5367 | 1.7925 |

As can be seen in FIGS. 10A and 10B of the disclosure (viewed in the X-Z plane), the change of Y position of the first lens L1A and the second lens L1B of the first lens group results in a change of the shape of the lens being presented along the optical axis (Z-axis) of the lens system. This change in shape varies the combined refractive power of the first and second lens of the first lens group, resulting in the change of the focal length of the lens system.

In contrast, the movement of the second lens group along the X-axis is provided in order to compensate for the change in refractive power of the lens system 500 when changing from the wide-angle state to the telephoto state in order to keep the image plane in a fixed position along the optical axis of the lens system.

In this example, the smoothly varying free-form surfaces of the first and second lenses of the first lens group G1 are described by a Fringe Zernike polynomial (see Equation 2 of the present disclosure). The values for the coefficients of the Fringe Zernike polynomial in this specific example are provided in Table 7 of the present disclosure.

| Surface # | Surface coefficients |
|---|---|
| 1 | K: 1.2000E+01 ZF3: −2.7595E−01 ZF4: −1.2408E−02 ZF6: −2.3786E−02 ZF8: −2.9753E−02 ZF9: 1.3037E−01 ZF11: −9.0224E−02 ZF13: 2.2450E−02 ZF15: 2.3287E−01 ZF16: 1.0490E−01 ZF18: 2.5105E−02 ZF20: 2.2372E−01 ZF22: 1.5979E−03 ZF24: 5.8304E−02 ZF25: 2.7573E−02 ZF27: 1.1821E−01 ZF29: 3.7350E−04 ZF31: 9.8321E−03 ZF33: 3.9546E−03 ZF35: 3.0329E−02 ZF36: 1.0698E−02 ZF37: 5.7782E−04 |
| 2 | K: −1.2000E+01 ZF3: −1.9233E−01 ZF4: −5.8851E−02 ZF6: −6.3215E−02 ZF8: −3.6826E−02 ZF9: 1.1255E−01 ZF11: −2.1776E−02 ZF13: 8.1399E−03 ZF15: 2.4385E−01 ZF16: 1.0075E−01 ZF18: −1.1124E−03 ZF20: 2.6289E−01 ZF22: 1.6884E−03 ZF24: 5.4081E−02 ZF25: 2.4766E−02 ZF27: 1.5960E−01 ZF29: −2.1915E−03 ZF31: 1.1822E−02 ZF33: 4.7028E−03 ZF35: 2.9950E−02 ZF36: 1.0971E−02 ZF37: 1.3369E−03 |
| 3 | K: 1.2000E+01 ZF3: 2.7595E−01 ZF4: −1.2408E−02 ZF6: −2.3786E−02 ZF8: 2.9753E−02 ZF9: 1.3037E−01 ZF11: 9.0224E−02 ZF13: 2.2450E−02 ZF15: −2.3287E−01 ZF16: 1.0490E−01 ZF18: 2.5105E−02 ZF20: −2.2372E−01 ZF22: −1.5979E−03 ZF24: −5.8304E−02 ZF25: 2.7573E−02 ZF27: −1.1821E−01 ZF29: 3.7350E−04 ZF31: −9.8321E−03 ZF33: 3.9546E−03 ZF35: −3.0329E−02 ZF36: 1.0698E−02 ZF37: 5.7782E−04 |
| 4 | K: −1.2000E+01 ZF3: 1.9233E−01 ZF4: −5.8851E−02 ZF6: −6.3215E−02 ZF8: 3.6826E−02 ZF9: 1.1255E−01 ZF11: 2.1776E−02 ZF13: 8.1399E−03 ZF15: −2.4385E−01 ZF16: 1.0075E−01 ZF18: −1.1124E−03 ZF20: −2.6289E−01 ZF22: −1.6884E−03 ZF24: −5.4081E−02 ZF25: 2.4766E−02 ZF27: −1.5960E−01 ZF29: −2.1915E−03 ZF31: −1.1822E−02 ZF33: 4.7028E−03 ZF35: −2.9950E−02 ZF36: 1.0971E−02 ZF37: 1.3369E−03 |

Table 7: Values of the Fringe Zernike polynomial coefficients for the first and second free-form lens for Numerical Example 2 of the present disclosure.

As noted above, in this specific example, the lens surfaces 6 to 15 are aspherical surfaces. These surfaces, in this example, are defined by Equation 3 of the present disclosure. Accordingly, numerical values for the aspherical coefficients of these lenses are provided in Table 8 of the present disclosure.

TABLE 8

Values of the aspherical coefficients for the lenses of the second lens group for Numerical Example 2 of the present disclosure.

| Surface # | Surface coefficients |
|---|---|
| 6 | K: −1.831309<br>A: 0.169235E−01 B: 0.578852E−02 C: −.513140E−01 D: 0.393015E−01 E: −.214896E−01 |
| 7 | K: 12.000000<br>A: −.417560E−02 B: −.182665E+00 C: 0.285422E+00 D: −.292930E+00 E: 0.153497E+00 F: −.322533E−01 |
| 8 | K: 0.730270<br>A: 0.103786E+00 B: −.110744E+00 C: 0.241213E+00 D: −.160395E+00 E: −.254055E−01 F: 0.714033E−01<br>G: −.215669E−01 |
| 9 | K: −11.974463<br>A: 0.565421E−01 B: 0.884237E−01 C: −.115431E+00 D: 0.303511E+00 E: −.363629E+00 F: 0.238571E+00 G: −.678739E−01 |
| 10 | K: 12.000000<br>A: −.178076E+00 B: −.170010E−01 C: −.753258E−01 D: 0.554775E−01 E: 0.348741E−01 F: 0.328168E−01<br>G: −.318477E−01 |
| 11 | K: 11.738388<br>A: −.116304E+00 B: −.229318E−01 C: −.483780E−01 D: 0.383497E−01 E: 0.378088E−01 F: −.221112E−01<br>G: 0.267530E−02 |
| 12 | K: 4.683158<br>A: 0.139866E+00 B: −.734088E−02 C: −.666434E−01 D: 0.192887E−01 E: 0.182569E−01 F: −.900552E−02<br>G: −.221538E−02<br>H: 0.702106E−03 J: 0.280101E−03 |
| 13 | K: 11.997643<br>A: 0.823597E−01 B: 0.597324E−01 C: −.953792E−01 D: 0.502482E−01 E: −.149413E−01 F: 0.286613E−02<br>G: −.366028E−03<br>H: 0.270016E−04 J: −.553145E−06 |
| 14 | K: −12.000875<br>A: −.387792E+00 B: 0.196587E+00 C: −.604516E−01 D: 0.162619E−01 E: −.354535E−02 F: 0.492276E−03<br>G: −.388369E−04<br>H: 0.181643E−05 J: −.568560E−07 |
| 15 | K: −11.997492<br>A: −.170768E+00 B: 0.685129E−01 C: −.180595E−01 D: 0.335996E−02 E: −.426832E−03 F: 0.202277E−04<br>G: 0.283807E−05<br>H: −.296638E−06 J: −.852369E−08 |

Figure 11A:
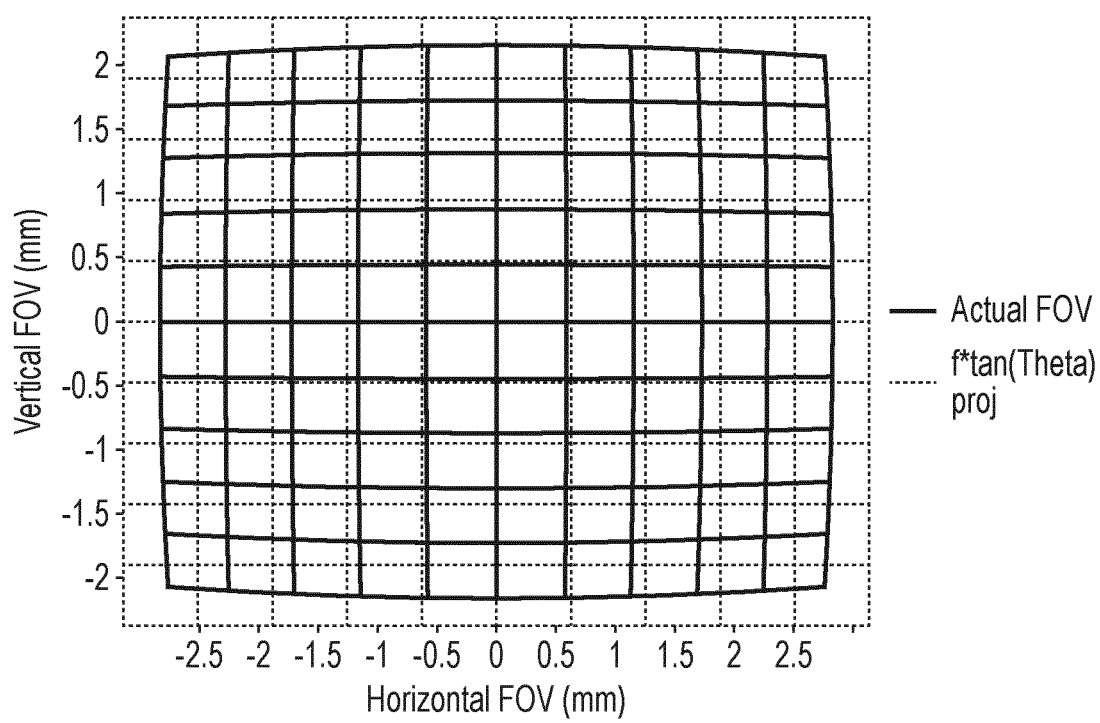
FIG. 11A shows distortion for an example lens system in a telephoto state in accordance with embodiments of the disclosure.
Figure 11B:
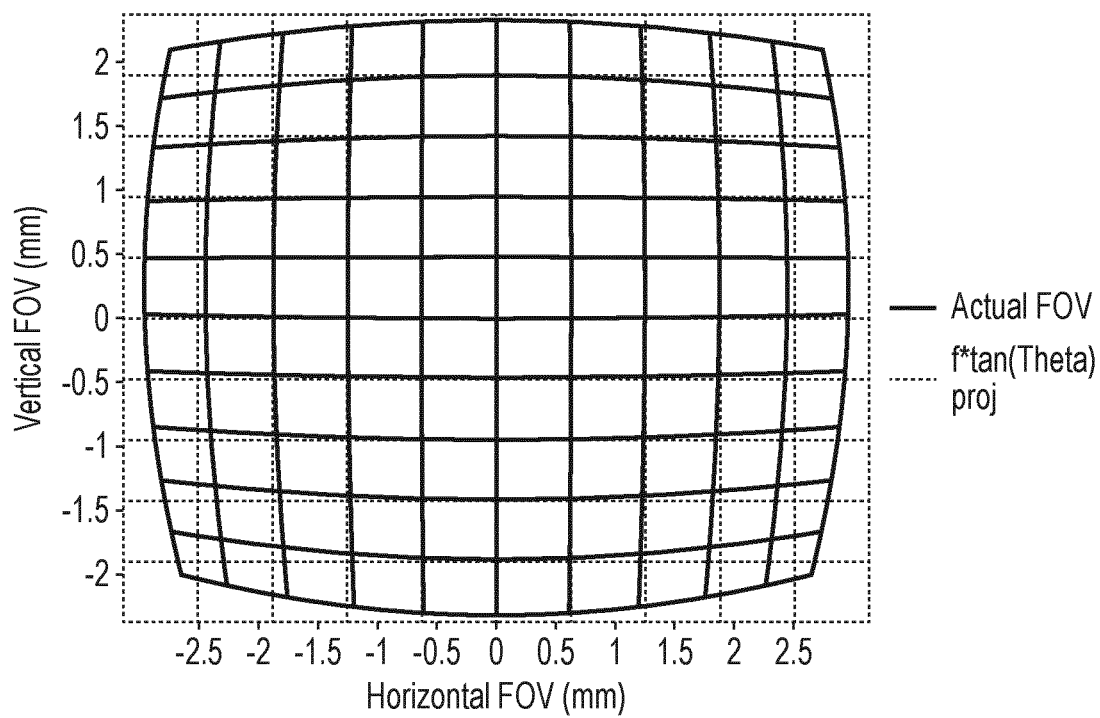
FIG. 11B shows distortion for an example lens system in a wide-angle state in accordance with embodiments of the disclosure.

FIG. 11A shows the distortion of the lens system 500 of this example in a maximum telephoto state. FIG. 11B, however, shows the distortion of the lens system 500 of this example in a maximum wide-angle state.

Figure 12A:
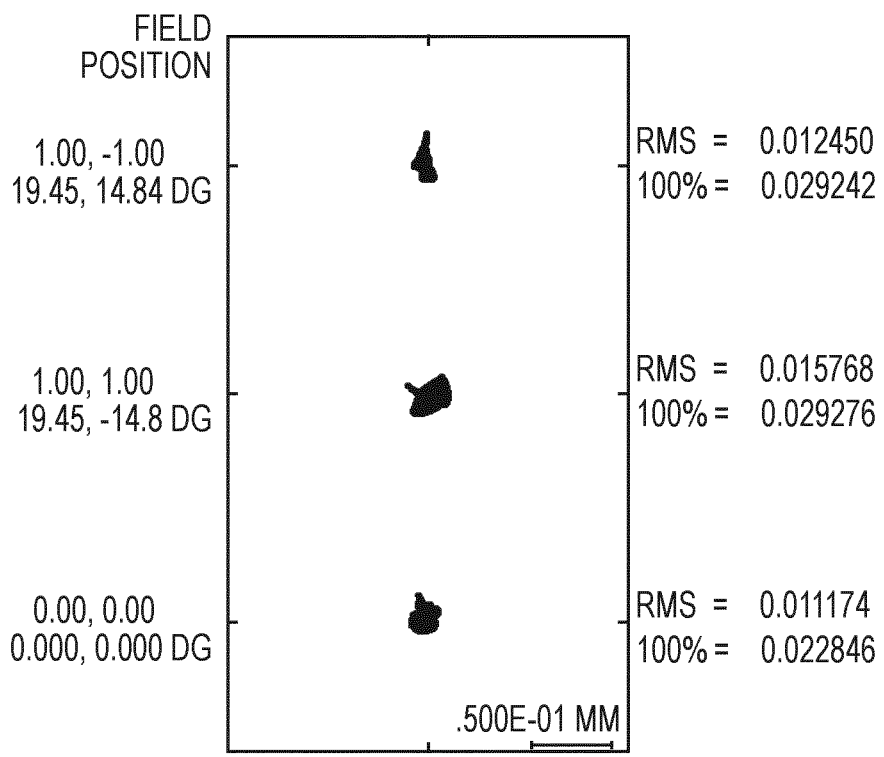
FIG. 12A shows a spot diagram produced by an example lens system in a telephoto state in accordance with embodiments of the disclosure.
Figure 12B:
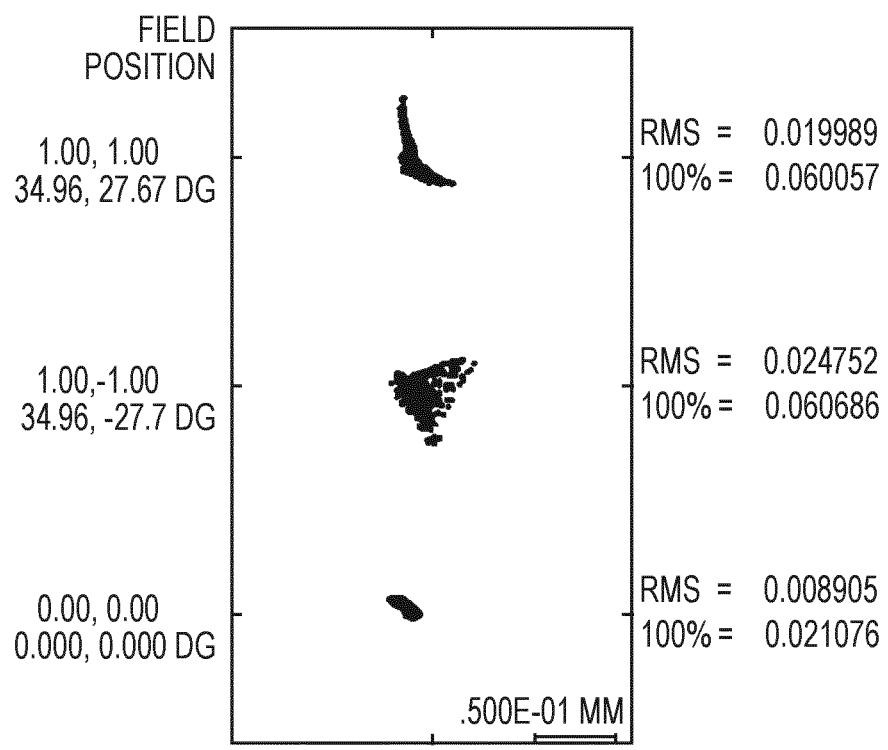
FIG. 12B shows a spot diagram produced by an example lens system in a wide-angle state in accordance with embodiments of the disclosure.

FIGS. 12A and 12B show spot diagrams in the maximum telephoto and maximum wide-angle state, respectively, at a scale of 0.05 mm.

From these Figures, it can be seen that the lens system 500 of this numerical example achieves good imaging performance in both the wide angle and telephoto state.

Furthermore, the values of the lens system 500 for the above identified conditional expressions (4) to (11) of the present disclosure are as follows:

$|\varphi 12 W1| \cdot fw = 0.0835$ $|\varphi 12 W1| \cdot ft = 0.4711$ $|\varphi 12 WX - \varphi 12 WY| \cdot fw = 0.00104$ $|\varphi 12 TX - \varphi 12 TY| \cdot ft = 0.00043$ $|\varphi 12 WX / \varphi 12 WY| = 0.9877$ $|\varphi 12 TX / \varphi 12 TY| = 1.001$ $|\Delta LA| / ft = 0.652$ $|\Delta LB| / ft = 0.635$ Each of these values is within the range of the respective conditional expression, thus ensuring the imaging performance of the lens system 500.

Further Applications of the Lens System

The technology according to the present disclosure can be applied to various example products, devices and/or situations. For example, the technology according to the present disclosure may be applied to products such as automobiles, electric vehicles, hybrid electric vehicles, motorcycles, bicycles, personal mobility vehicles, airplanes, drones, ships, robots, construction machines, agricultural machines (such as tractors), and the like. In these cases, the lens system 100 may be mounted on the body of these vehicles.

Figure 13:
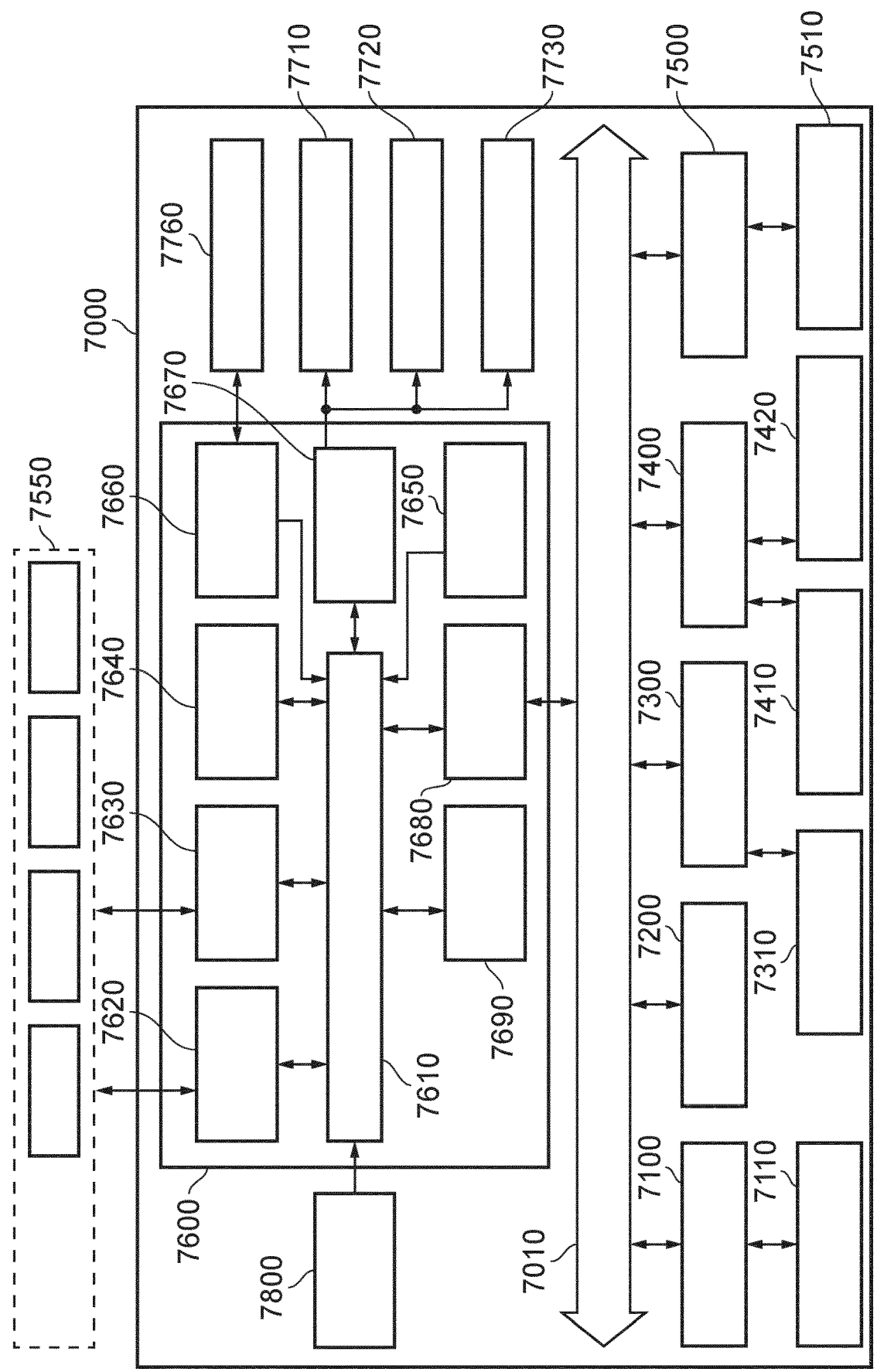
FIG. 13 illustrates an example vehicle control system in accordance with embodiments of the disclosure.

FIG. 13 is a block diagram showing a schematic configuration example of a vehicle control system 7000, which is an example of a mobile control system to which the technology according to the present disclosure can be applied. Vehicle control system 7000 comprises a plurality of electronic control units connected via communication network 7010. In the example illustrated in FIG. 13, the vehicle control system 7000 includes a drive system control unit 7100, a body system control unit 7200, a battery control unit 7300, an outside information detection unit 7400, an in-vehicle information detection unit 7500, and an integrated control unit 7600. The communication network 7010 connecting the plurality of control units is, for example, an arbitrary standard such as CAN (Controller Area Network), LIN (Local Interconnect Network), LAN (Local Area Network), or FlexRay (registered trademark). It may be an in-vehicle communication network.

Each control unit includes a microcomputer that performs arithmetic processing in accordance with various programs, a storage unit that stores programs executed by the microcomputer or parameters used in various arithmetic operations, and drive circuits that drive devices to be controlled. Equipped with each control unit is provided with a network I/F for communicating with other control units via the communication network 7010, and by wired communication or wireless communication with an apparatus or sensor inside or outside the vehicle.

In FIG. 13, as the functional configuration of the integrated control unit 7600, a microcomputer 7610, a general-purpose communication I/F 7620, a dedicated communication I/F 7630, a positioning unit 7640, a beacon receiving unit 7650, an in-vehicle device I/F 7660, an audio image output unit 7670 An in-vehicle network I/F 7680 and a storage unit 7690 are illustrated. The other control units also include a microcomputer, a communication I/F, a storage unit, and the like.

Drive system control unit 7100 controls the operation of devices related to the drive system of the vehicle according to various programs. For example, drive system control unit 7100 includes a drive force generation device for generating a drive force of a vehicle such as an internal combustion engine or a drive motor, a drive force transmission mechanism for transmitting the drive force to the wheels, and a steering angle of the vehicle. It functions as a control mechanism such as a steering mechanism that adjusts and a braking device that generates a braking force of the vehicle. The drive system control unit 7100 may have a function as a control device such as an ABS (Antilock Brake System) or an ESC (Electronic Stability Control).

Vehicle state detection unit 7110 is connected to drive system control unit 7100. The vehicle state detection unit 7110 may be, for example, a gyro sensor that detects an angular velocity of an axial rotational movement of a vehicle body, an acceleration sensor that detects an acceleration of the vehicle, or an operation amount of an accelerator pedal, an operation amount of a brake pedal, and steering of a steering wheel. At least one of the sensors for detecting the angle, the engine speed, the rotational speed of the wheel, and the like is included. Drive system control unit 7100 performs arithmetic processing using a signal input from vehicle state detection unit 7110 to control an internal combustion engine, a drive motor, an electric power steering device, a brake device, and the like.

Body system control unit 7200 controls the operation of various devices equipped on the vehicle body according to various programs. For example, the body control unit 7200 functions as a keyless entry system, a smart key system, a power window device, or a control device of various lamps such as a head lamp, a back lamp, a brake lamp, a blinker or a fog lamp. In this case, the body system control unit 7200 may receive radio waves or signals of various switches transmitted from a portable device substituting a key. Body system control unit 7200 receives the input of these radio waves or signals, and controls a door lock device, a power window device, a lamp and the like of the vehicle.

The battery control unit 7300 controls the secondary battery 7310, which is a power supply source of the drive motor according to various programs. For example, information such as the battery temperature, the battery output voltage, or the remaining capacity of the battery is input to the battery control unit 7300 from the battery device provided with the secondary battery 7310. The battery control unit 7300 performs arithmetic processing using these signals, and performs temperature adjustment control of the secondary battery 7310 or control of a cooling device or the like provided in the battery device.

Outside-vehicle information detection unit 7400 detects information outside the vehicle equipped with vehicle control system 7000. For example, at least one of the imaging unit 7410 and the external information detection unit 7420 is connected to the external information detection unit 7400.

The imaging unit 7410 includes at least one of a time-of-flight (ToF) camera, a stereo camera, a monocular camera, an infrared camera, and another camera. For example, an environment sensor for detecting the current weather, or another vehicle, an obstacle or a pedestrian around the vehicle equipped with the vehicle control system 7000 is detected in the outside-vehicle information detection unit 7420, for example.

The environment sensor may be, for example, at least one of a raindrop sensor that detects wet weather, a fog sensor that detects fog, a sunshine sensor that detects sunshine intensity, and a snow sensor that detects snowfall. The ambient information detection sensor may be at least one of an ultrasonic sensor, a radar device, and a light detection and ranging (LIDAR) device. The imaging unit 7410 and the external information detection unit 7420 may be provided as independent sensors or devices, or may be provided as an integrated device of a plurality of sensors or devices.

Figure 14:
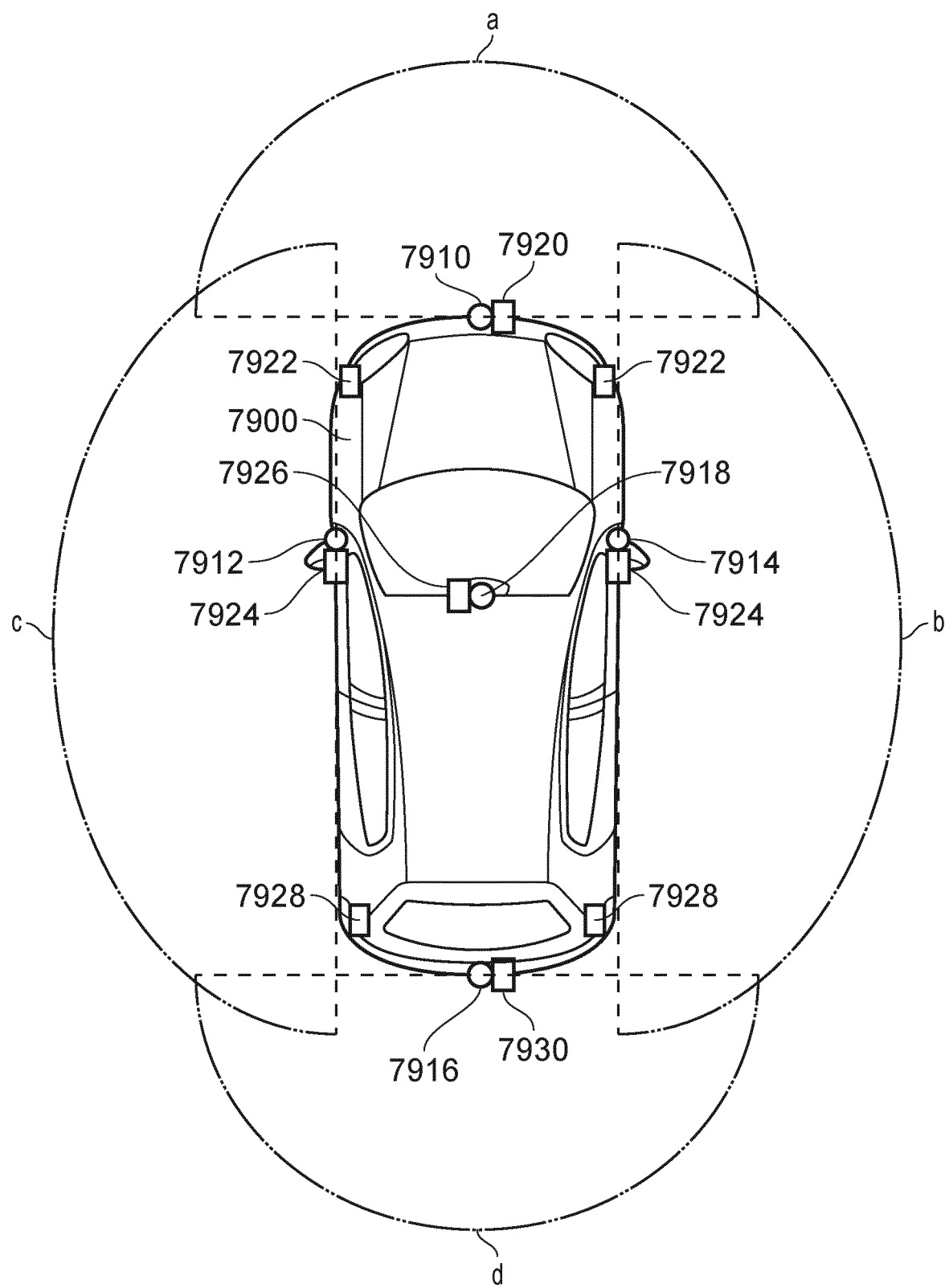
FIG. 14 illustrates the example placement of imaging devices on a vehicle in accordance with embodiments of the disclosure.

Referring now to FIG. 14, an example of installation positions of the imaging unit 7410 and the external information detection unit 7420 on a vehicle is shown. The imaging units 7910, 7912, 7914, 7916, 7918 are provided at, for example, at least one of the front nose of the vehicle 7900, the side mirror, the rear bumper, the back door, and the upper portion of the windshield of the vehicle interior. An imaging unit 7910 provided in the front nose and an imaging unit 7918 provided in the upper part of the windshield in the vehicle cabin mainly acquire an image in front of the vehicle 7900. The imaging units 7912 and 7914 provided in the side mirror mainly acquire an image of the side of the vehicle 7900. An imaging unit 7916 provided in the rear bumper or back door mainly acquires an image behind the vehicle 7900. The imaging unit 7918 provided on the upper part of the windshield in the passenger compartment is mainly used to detect a leading vehicle or a pedestrian, an obstacle, a traffic light, a traffic sign, a lane, or the like.

Note that FIG. 14 illustrates an example of the imaging range of each of the imaging units 7910, 7912, 7914, and 7916. The imaging range of FIG. 14 indicates the imaging range of the imaging unit 7910 provided on the front nose, the imaging ranges b and c of FIG. 14 indicate the imaging ranges of the imaging units 7912 and 7914 provided on the side mirrors, and the imaging range d of FIG. 14 indicates The imaging range of the imaging part 7916 provided in the rear bumper or the back door is shown. For example, by overlaying the image data captured by the imaging units 7910, 7912, 7914, and 7916, a bird's-eye view of the vehicle 7900 as viewed from above can be obtained.

The external information detection units 7920, 7922, 7924, 7926, 7928, and 7930 provided on the front, rear, sides, and corners of the vehicle 7900 and above the windshield of the vehicle interior may be, for example, ultrasonic sensors or radar devices. The external information detection units 7920, 7926, 7930 provided on the front nose of the vehicle 7900, the rear bumper, the back door, and the upper part of the windshield of the vehicle interior may be, for example, a LIDAR device. These outside-of-vehicle information detection units 7920 to 7930 are mainly used for detecting a preceding vehicle, a pedestrian, an obstacle or the like.

Returning now to FIG. 13, the description of the vehicle control system 7000 is continued. The out-of-vehicle information detection unit 7400 causes the imaging unit 7410 to capture an image outside the vehicle, and receives the captured image data. Further, the external information detection unit 7400 receives detection information from the external information detection unit 7420 connected. When the out-of-vehicle information detection unit 7420 is an ultrasonic sensor, a radar device, or a LIDAR device, the out-of-vehicle information detection unit 7400 transmits ultrasonic waves or electromagnetic waves and receives information on the received reflected waves. The external information detection unit 7400 may perform object detection processing or distance detection processing of a person, a car, an obstacle, a sign, a character on a road surface, or the like based on the received information. The external information detection unit 7400 may perform environment recognition processing for recognizing rainfall, fog, road surface conditions and the like based on the received information. The external information detection unit 7400 may calculate the distance to an object outside the vehicle based on the received information.

Further, the external information detection unit 7400 may perform image recognition processing or distance detection processing for recognizing a person, a car, an obstacle, a sign, a character on a road surface, or the like based on the received image data. The external information detection unit 7400 performs processing such as distortion correction or alignment on the received image data, and combines the image data captured by different imaging units 7410 to generate an overhead image or a panoramic image. The external information detection unit 7400 may perform viewpoint conversion processing using image data captured by different imaging units 7410.

An in-vehicle information detection unit 7500 detects information in the vehicle. For example, a driver state detection unit 7510 that detects a state of a driver is connected to the in-vehicle information detection unit 7500. The driver state detection unit 7510 may include a camera for imaging the driver, a biometric sensor for detecting the driver's biological information, a microphone for collecting sound in the vehicle interior, and the like. The biological sensor is provided, for example, on a seat or a steering wheel, and detects biological information of an occupant sitting on a seat or a driver who grips the steering wheel. The in-vehicle information detection unit 7500 may calculate the degree of fatigue or concentration of the driver based on the detection information input from the driver state detection unit 7510, or determine whether the driver does not go to sleep. The in-vehicle information detection unit 7500 may perform processing such as noise cancelling processing on the collected audio signal.

The integrated control unit 7600 controls the overall operation in the vehicle control system 7000 in accordance with various programs. An input unit 7800 is connected to the integrated control unit 7600. The input unit 7800 is realized by, for example, a device such as a touch panel, a button, a microphone, a switch or a lever, which can be input operated by the passenger. The integrated control unit 7600 may receive data obtained by speech recognition of speech input by the microphone. The input unit 7800 may be, for example, a remote control device using infrared rays or other radio waves, or an external connection device such as a mobile phone or a PDA (Personal Digital Assistant) corresponding to the operation of the vehicle control system 7000. The input unit 7800 may be, for example, a camera, in which case the passenger can input information by gesture. Alternatively, data obtained by detecting the movement of the wearable device worn by the passenger may be input.

Furthermore, the input unit 7800 may include, for example, an input control circuit that generates an input signal based on the information input by the passenger or the like using the above-described input unit 7800 and outputs the generated signal to the integrated control unit 7600. The passenger or the like operates the input unit 7800 to input various data to the vehicle control system 7000 and instruct processing operations.

The storage unit 7690 may include a ROM (Read Only Memory) that stores various programs executed by the microcomputer, and a RAM (Random Access Memory) that stores various parameters, calculation results, sensor values, and the like. In addition, the storage unit 7690 may be realized by a magnetic storage device such as a hard disk drive (HDD), a semiconductor storage device, an optical storage device, a magneto-optical storage device, or the like.

The general-purpose communication I/F 7620 is a general-purpose communication I/F that mediates communication with various devices existing in the external environment 7750. General-purpose communication I/F 7620 is a cellular communication protocol such as GSM (registered trademark) (Global System of Mobile communications), WiMAX (registered trademark), LTE (registered trademark) (Long Term Evolution) or LTE-A (LTE-Advanced). Or, other wireless communication protocols such as wireless LAN (also referred to as Wi-Fi (registered trademark)), Bluetooth (registered trademark), and the like may be implemented. The general-purpose communication I/F 7620 is connected to, for example, an apparatus (for example, an application server or control server) existing on an external network (for example, the Internet, a cloud network, or an operator-specific network) via a base station or access point. The general-purpose communication I/F 7620 is a terminal (for example, a driver, a pedestrian or a shop terminal, or an MTC (Machine Type Communication) terminal) existing near the vehicle using, for example, P2P (Peer To Peer) technology. It may be connected with the dedicated communication I/F 7630, which is a communication I/F that supports a communication protocol designed for use in a vehicle. The dedicated communication I/F 7630 may be a standard protocol such as WAVE (Wireless Access in Vehicle Environment), DSRC (Dedicated Short Range Communications), or cellular communication protocol, which is a combination of lower layer IEEE 802.11p and upper layer IEEE 1609, for example. The dedicated communication I/F 7630 is typically used for Vehicle to Vehicle communication, Vehicle to Infrastructure communication, Vehicle to Home communication, and Vehicle to Pedestrian. 2.) Perform V2X communication, a concept that includes one or more of the communication.

The positioning unit 7640 receives a GNSS signal (for example, a GPS signal from a Global Positioning System (GPS) satellite) from, for example, a Global Navigation Satellite System (GNSS) satellite and executes positioning, thereby performing latitude, longitude, and altitude of the vehicle. Generate location information including positioning section 7640 may specify the current position by exchanging signals with the wireless access point, or may acquire position information from a terminal such as a mobile phone having a positioning function, a smartphone or the like.

The beacon-receiving unit 7650 receives, for example, radio waves or electromagnetic waves transmitted from a radio station or the like installed on a road, and acquires information such as the current position, traffic jams, closing times or required time. The function of the beacon reception unit 7650 may be included in the above described dedicated communication I/F 7630.

An in-vehicle apparatus I/F 7660 is a communication interface that mediates the connection between the microcomputer 7610 and various in-vehicle apparatuses 7760 existing in the vehicle. The in-car device I/F 7660 may establish a wireless connection using a wireless communication protocol such as wireless LAN, Bluetooth (registered trademark), NFC (Near Field Communication), or WUSB (Wireless USB). Further, the in-vehicle device I/F 7660 is connected via a connection terminal (not shown) (and, if necessary, a cable) via USB (Universal Serial Bus), HDMI (High-Definition Multimedia Interface), or MHL (Mobile), a wired connection such as High-Definition Link may be established. The in-vehicle device 7760 may include, for example, at least one of a mobile device or wearable device owned by a passenger, or an information device carried in or attached to a vehicle. Further, the in-vehicle device 7760 may include a navigation device for performing a route search to any destination.

The in-vehicle device I/F 7660 exchanges control signals or data signals with these in-vehicle devices 7760. The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 is connected via at least one of a general-purpose communication I/F 7620, a dedicated communication I/F 7630, a positioning unit 7640, a beacon reception unit 7650, an in-vehicle device I/F 7660, and an in-vehicle network I/F 7680. The vehicle control system 7000 is controlled in accordance with various programs based on the information acquired. For example, the microcomputer 7610 calculates a control target value of the driving force generation device, the steering mechanism or the braking device based on the acquired information inside and outside the vehicle, and outputs a control command to the driving system control unit 7100. For example, the microcomputer 7610 realizes the function of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, and the like. In addition, the microcomputer 7610 automatically runs without using the driver's operation by controlling the driving force generating device, the steering mechanism, the braking device, and the like, based on the acquired information of the surroundings of the vehicle. Coordinated control may be performed for the purpose of driving, for example.

The microcomputer 7610 has information acquired via at least one of a general-purpose communication I/F 7620, a dedicated communication I/F 7630, a positioning unit 7640, a beacon reception unit 7650, an in-vehicle device I/F 7660, and an in-vehicle network I/F 7680. Based on the above, three-dimensional distance information between the vehicle and an object such as a surrounding structure or a person may be generated, and local map information including the peripheral information of the current position of the vehicle may be created. Further, the microcomputer 7610 may predict a danger such as a collision of a vehicle or a pedestrian or the like approaching a road or the like on the basis of the acquired information, and may generate a signal for warning. The warning signal may be, for example, a signal for generating a warning sound or lighting a warning lamp.

The audio image output unit 7670 transmits an output signal of at least one of audio and image to an output device capable of visually or aurally notifying information to a passenger or the outside of a vehicle. In the example of FIG.

13, an audio speaker 7710, a display unit 7720, and an instrument panel 7730 are illustrated as output devices. The display unit 7720 may include, for example, at least one of an on-board display and a head-up display. The display portion 7720 may have an AR (Augmented Reality) display function. The output device may be another device such as a headphone, a wearable device such as a glasses-type display worn by a passenger, a projector, or a lamp other than these devices. When the output device is a display device, the display device may obtain information obtained from various processes performed by the microcomputer 7610 or information received from another control unit in various formats such as text, images, tables, graphs, or the like. This information is then visually displayed by the display device.

When the output device is an audio output device, the audio output device converts an audio signal composed of reproduced audio data or audio data into an analog signal and outputs it in an auditory manner.

In the example shown in FIG. 13, at least two control units connected via the communication network 7010 may be integrated as one control unit. Alternatively, each control unit may be configured by a plurality of control units. Furthermore, the vehicle control system 7000 may comprise another control unit not shown. In the above description, part or all of the functions of any control unit may be provided to another control unit. That is, as long as transmission and reception of information are performed via the communication network 7010, predetermined arithmetic processing may be performed by any control unit. Similarly, while a sensor or device connected to any control unit is connected to another control unit, a plurality of control units may mutually transmit and receive detection information via the communication network 7010.

In the vehicle control system 7000 described above, with reference to FIGS. 13 and 14 of the present disclosure, the variable focal length lens system 100 and the imaging device 300 of the present disclosure can be applied to the imaging unit 7410 and the imaging units 7910, 7912, 7914, 7916, 7918.

Method

Figure 15:
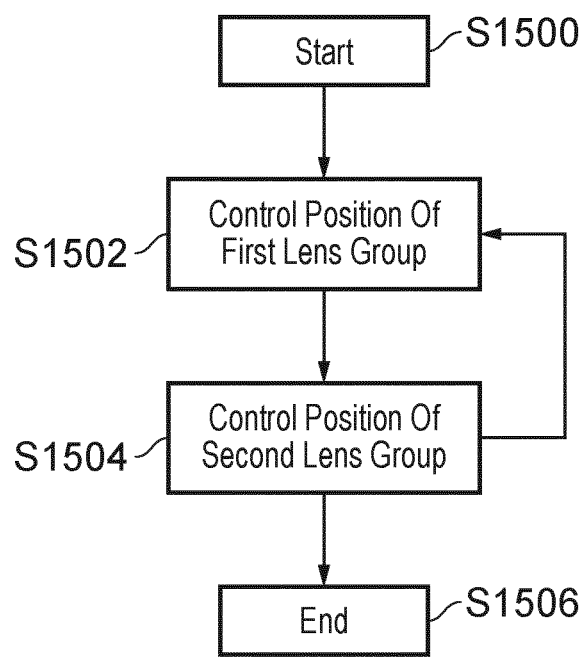
FIG. 15 illustrates a method of controlling a lens system in accordance with embodiments of the disclosure.

FIG. 15 illustrates a method of controlling a lens system in accordance with embodiments of the disclosure. This method may be applied to a lens system such as lens system 100 described with reference to FIG. 1 of the present disclosure.

The method starts with step S1500 and proceeds to step S1502.

In step S1502, the method comprises controlling a movement of a first lens of the pair of lenses (such as lens 102A) of the first lens group along a Y-axis of the lens system perpendicular to the optical axis Z of the lens system and a movement of a second lens of the pair of lenses (such as lens 102B) of the first lens group in an opposite direction to the first lens of the pair of lenses along the Y-axis in accordance with the movement of the first lens of the pair of lenses along the Y-axis in accordance with the movement of the first lens of the pair of lenses, to change a refractive power of the lens system.

Once the movement of the first and second lens of the pair of lenses have been moved, the method proceeds to step S1504.

In step S1504, the method comprises controlling a movement of the second lens group along the optical axis Z of the lens system in accordance with the movement of the pair of lenses along the Y-axis to maintain an image position of the lens system.

In some examples, it will be appreciated that methods step S1504 may be performed prior to method step S1502. Alternatively, method steps S1502 and S1504 may be performed in parallel or substantially simultaneously.

Once S1305 has been performed, the method may return to S1500 or step S1502. Alternatively, if no further movement of the lens system is desired, the method will proceed to, and end with, method step S1506.

In addition, technical features and aspects of the present disclosure may further be arranged in accordance with the following numbered Clauses:

1. A lens system for an imaging device, the lens system comprising:
    a first lens group, having a fixed position along an optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system;
    and a second lens group, arranged along the optical axis Z of the lens system, comprising a plurality of rotationally symmetrical lenses;
        wherein a first lens of the pair of lenses of the first lens group is configured to be moveable along a Y-axis of the lens system perpendicular to the optical axis Z of the lens system, and a second lens of the pair of lenses of the first lens group is configured to be moveable in an opposite direction to the first lens of the pair of lenses along the Y-axis, in accordance with the movement of the first lens of the pair of lenses, to change a refractive power of the lens system;
        and wherein the second lens group is configured to be moveable along the optical axis Z of the lens system in accordance with the movement of the pair of lenses along the Y-axis to maintain an image position of the lens system.
2. The lens system according to Clause 2, wherein the lens system satisfies the condition:

$$0.05<|\varphi 12W|\cdot fw<0.35$$

wherein φ12W is the combined axial refractive power of the pair of lenses of the first lens group in a maximum wide-angle state of the lens system, and fw is the focal length of the lens system in the maximum wide-angle state.
3. The lens system according to any preceding Clause, wherein the lens system satisfies the condition:

$$0.25<|\varphi 12T|\cdot ft<0.95$$

wherein φ12T is the combined axial refractive power of the pair of lenses of the first lens group in a maximum telephoto state of the lens system, and ft is the focal length of the lens system in the maximum telephoto state.
4. The lens system according to any preceding Clause, wherein the lens system satisfies the conditions:

$$|\varphi 12WX-\varphi 12WY|\cdot fw<0.03$$

$$|\varphi 12TX-\varphi 12TY|\cdot ft<0.03$$

wherein φ12WX is the combined axial refractive power of the pair of lenses of the first lens group along an X-axis of the lens system, perpendicular to the Y-axis and the optical axis Z of the lens system, in a maximum wide-angle state of the lens system; φ12WY is the combined axial refractive power of the pair of lenses of the first lens group along the Y-axis in the maximum wide-angle state; φ12TX is the combined axial refractive power of the pair of lenses of the first lens group along the X-axis at a maximum telephoto state of the lens system; φ12TY is the combined axial refractive power of the pair of lenses of the first lens group along the Y-axis at the maximum telephoto state of the lens system; fw is the focal length of the lens system at the maximum wide-angle state; and ft is the focal length of the lens system at the maximum telephoto state.

5. The lens system according to any preceding Clause, wherein the lens system satisfies the conditions:

$$0.85 < |\varphi 12WX/\varphi 12WY| < 1.15$$

$$0.85 < |\varphi 12TX/\varphi 12TY| < 1.15$$

wherein φ12WX is the combined axial refractive power of the pair of lenses of the first lens group along an X-axis of the lens system, perpendicular to the Y-axis and the optical axis Z of the lens system, in a maximum wide-angle state of the lens system; φ12WY is the combined axial refractive power of the pair of lenses of the first lens group along the Y-axis in the maximum wide-angle state; φ12TX is the combined axial refractive power of the pair of lenses of the first lens group along the X-axis in a maximum telephoto state of the lens system; and φ12TY is the combined axial refractive power of the pair of lenses of the first lens group along the Y-axis in the maximum telephoto state of the lens system.

6. The lens system according to any preceding Clause, wherein the lens system satisfies the conditions:

$$0.2 < |\Delta LA|/ft < 0.85$$

$$0.2 < |\Delta LB|/ft < 0.85$$

wherein ΔLA is the movement of the first lens of the pair of lenses of the first lens group along the Y-axis when the lens system changes from a maximum wide-angle state to a maximum telephoto state, ΔLB is the movement of the second lens of the pair of lenses of the first lens group along the Y-axis when the lens system changes from the maximum wide-angle state to the maximum telephoto state, and ft is the focal length of the lens system in the maximum telephoto state.

7. The lens system according to any preceding Clause, wherein the magnitude of the movement of the first lens of the pair of lenses of the first lens group along the Y-axis is the same as the magnitude of the movement of the second lens of the pair of lenses of the first lens group along the Y-axis.

8. The lens system according to any preceding Clause, wherein the shape of the first lens and the second lens of the pair of lenses of the first lens group is symmetrical in a plane formed by the Y-axis and optical axis Z of the lens system.

9. An imaging device, the imaging device including:
a lens system according to any preceding Clause; and
an image capture unit.

10. The lens system according to Clause 9, wherein the lens system further comprises an optical low pass filter arranged between the lens system and the imaging device.

11. A method of controlling a lens system for an imaging device, the lens system comprising:
a first lens group, having a fixed position along an optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and
a second lens group, arranged along the optical axis X of the lens system, comprising a plurality of rotationally symmetrical lenses;
wherein the method comprises:
controlling a movement of a first lens of the pair of lenses of the first lens group along a Y-axis of the lens system perpendicular to the optical axis Z of the lens system and a movement of a second lens of the pair of lenses of the first lens group in an opposite direction to the first lens of the pair of lenses along the Y-axis in accordance with the movement of the first lens of the pair of lenses along the Y-axis, to change a refractive power of the lens system; and
controlling a movement of the second lens group along the optical axis Z of the lens system in accordance with the movement of the pair of lenses along the Y-axis to maintain an image position of the lens system.

12. A computer program product comprising instructions, which, when the program is executed by the computer, cause the computer to carry out a method of controlling a lens system for an imaging device, the lens system comprising:
a first lens group, having a fixed position along an optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and
a second lens group, arranged along the optical axis X of the lens system, comprising a plurality of rotationally symmetrical lenses;
wherein the method comprises:
controlling a movement of a first lens of the pair of lenses of the first lens group along a Y-axis of the lens system perpendicular to the optical axis Z of the lens system and a movement of a second lens of the pair of lenses of the first lens group in an opposite direction to the first lens of the pair of lenses along the Y-axis in accordance with the movement of the first lens of the pair of lenses along the Y-axis, to change a refractive power of the lens system; and
controlling a movement of the second lens group along the optical axis Z of the lens system in accordance with the movement of the pair of lenses along the Y axis to maintain an image position of the lens system.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A lens system for an imaging device, the lens system comprising:
a first lens group, having a fixed position along an optical axis Z of the lens system during zooming and being movable with respect to a Y-axis of the lens system perpendicular to the optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and
a second lens group, arranged along the optical axis Z of the lens system, comprising a plurality of rotationally symmetrical lenses;
wherein a first lens of the pair of lenses of the first lens group is configured to be moveable along the Y-axis, and a second lens of the pair of lenses of the first lens group is configured to be moveable in an opposite direction to the first lens of the pair of lenses along the Y-axis, in accordance with the movement of the first lens of the pair of lenses, to change a refractive power of the lens system;
wherein the second lens group is configured to be moveable along the optical axis Z of the lens system in accordance with the movement of the pair of lenses along the Y-axis to maintain an image position of the lens system; and
wherein the lens system satisfies the conditions:

$$0.2<|\Delta LA|/ft<0.85,$$

$$0.2<|\Delta LB|/ft<0.85,$$

wherein $\Delta LA$ is the movement of the first lens of the pair of lenses of the first lens group along the Y-axis when the lens system changes from a maximum wide-angle state to a maximum telephoto state, $\Delta LB$ is the movement of the second lens of the pair of lenses of the first lens group along the Y-axis when the lens system changes from the maximum wide-angle state to the maximum telephoto state, and ft is the focal length of the lens system in the maximum telephoto state.

2. The lens system according to claim 1, wherein the lens system satisfies the condition:

$$0.05<|\varphi 12W|\cdot fw<0.35,$$

wherein $\varphi 12W$ is the combined axial refractive power of the pair of lenses of the first lens group in a maximum wide-angle state of the lens system, and fw is the focal length of the lens system in the maximum wide-angle state.

3. The lens system according to claim 1, wherein the lens system satisfies the condition:

$$0.25<|\varphi 12T|\cdot ft<0.95,$$

wherein $\varphi 12T$ is the combined axial refractive power of the pair of lenses of the first lens group in a maximum telephoto state of the lens system, and ft is the focal length of the lens system in the maximum telephoto state.

4. The lens system according to claim 1, wherein the lens system satisfies the conditions:

$$|\varphi 12WX-\varphi 12WY|\cdot fw<0.03,$$

$$|\varphi 12TX-\varphi 12TY|\cdot ft\leq 0.03,$$

wherein $\varphi 12WX$ is the combined axial refractive power of the pair of lenses of the first lens group along an X-axis of the lens system, perpendicular to the Y-axis and the optical axis Z of the lens system, in a maximum wide-angle state of the lens system; $\varphi 12WY$ is the combined axial refractive power of the pair of lenses of the first lens group along the Y-axis in the maximum wide-angle state; $\varphi 12TX$ is the combined axial refractive power of the pair of lenses of the first lens group along the X-axis at a maximum telephoto state of the lens system; $\varphi 12TY$ is the combined axial refractive power of the pair of lenses of the first lens group along the Y-axis at the maximum telephoto state of the lens system; fw is the focal length of the lens system at the maximum wide-angle state; and ft is the focal length of the lens system at the maximum telephoto state.

5. The lens system according to claim 1, wherein the lens system satisfies the conditions:

$$0.85<|\varphi 12WX/\varphi 12WY|<1.15,$$

$$0.85<|\varphi 12TX/\varphi 12TY|<1.15,$$

wherein $\varphi 12WX$ is the combined axial refractive power of the pair of lenses of the first lens group along an X-axis of the lens system, perpendicular to the Y-axis and the optical axis Z of the lens system, in a maximum wide-angle state of the lens system; $\varphi 12WY$ is the combined axial refractive power of the pair of lenses of the first lens group along the Y-axis in the maximum wide-angle state; φ12TX is the combined axial refractive power of the pair of lenses of the first lens group along the X-axis in a maximum telephoto state of the lens system; and φ12TY is the combined axial refractive power of the pair of lenses of the first lens group along the Y-axis in the maximum telephoto state of the lens system.

6. The lens system according to claim 1, wherein the magnitude of the movement of the first lens of the pair of lenses of the first lens group along the Y-axis is the same as the magnitude of the movement of the second lens of the pair of lenses of the first lens group along the Y-axis.

7. The lens system according to claim 1, wherein the shape of the first lens and the second lens of the pair of lenses of the first lens group is symmetrical in a plane formed by the Y-axis and optical axis Z of the lens system.

8. An imaging device, the imaging device including:
a lens system according to claim 1; and
an image capture device.

9. The lens system according to claim 8, wherein the lens system further comprises an optical low pass filter arranged between the lens system and the imaging device.

10. A method of controlling a lens system for an imaging device, the lens system comprising:
a first lens group, having a fixed position along an optical axis Z of the lens system during zooming and being movable with respect to a Y-axis of the lens system perpendicular to the optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and
a second lens group, arranged along the optical axis Z of the lens system, comprising a plurality of rotationally symmetrical lenses;
wherein the method comprises:
controlling a movement of a first lens of the pair of lenses of the first lens group along the Y-axis and a movement of a second lens of the pair of lenses of the first lens group in an opposite direction to the first lens of the pair of lenses along the Y-axis in accordance with the movement of the first lens of the pair of lenses along the Y-axis, to change a refractive power of the lens system; and
controlling a movement of the second lens group along the optical axis Z of the lens system in accordance with the movement of the pair of lenses along the Y-axis to maintain an image position of the lens system,
wherein the lens system satisfies the conditions:

$$0.2<|\Delta LA|/ft \le 0.85,$$

$$0.2<|\Delta LB|/ft \le 0.85,$$

wherein ΔLA is the movement of the first lens of the pair of lenses of the first lens group along the Y-axis when the lens system changes from a maximum wide-angle state to a maximum telephoto state, ΔLB is the movement of the second lens of the pair of lenses of the first lens group along the Y-axis when the lens system changes from the maximum wide-angle state to the maximum telephoto state, and ft is the focal length of the lens system in the maximum telephoto state.

11. The method according to claim 10, wherein the lens system satisfies the condition:

$$0.05<|\varphi 12W|\cdot fw \le 0.352$$

wherein φ12 W is the combined axial refractive power of the pair of lenses of the first lens group in a maximum wide-angle state of the lens system, and fw is the focal length of the lens system in the maximum wide-angle state.

12. The method according to claim 10, wherein the lens system satisfies the condition:

$$0.25<|\varphi 12T|\cdot ft \le 0.95,$$

wherein φ12T is the combined axial refractive power of the pair of lenses of the first lens group in a maximum telephoto state of the lens system, and ft is the focal length of the lens system in the maximum telephoto state.

13. The method according to claim 10, wherein the lens system satisfies the conditions:

$$|\varphi 12WX-\varphi 12WY|\cdot fw \le 0.03,$$

$$|\varphi 12TX-\varphi 12TY|\cdot ft \le 0.032$$

wherein φ12WX is the combined axial refractive power of the pair of lenses of the first lens group along an X-axis of the lens system, perpendicular to the Y-axis and the optical axis Z of the lens system, in a maximum wide-angle state of the lens system; φ12WY is the combined axial refractive power of the pair of lenses of the first lens group along the Y-axis in the maximum wide-angle state; φ12TX is the combined axial refractive power of the pair of lenses of the first lens group along the X-axis at a maximum telephoto state of the lens system; φ12TY is the combined axial refractive power of the pair of lenses of the first lens group along the Y-axis at the maximum telephoto state of the lens system; fw is the focal length of the lens system at the maximum wide-angle state; and ft is the focal length of the lens system at the maximum telephoto state.

14. A non-transitory computer readable storage device having computer readable instructions stored thereon, which, when the program is executed by a computer, cause the computer to carry out a method of controlling a lens system for an imaging device, the lens system including:
a first lens group, having a fixed position along an optical axis Z of the lens system during zooming and being movable with respect to a Y-axis of the lens system perpendicular to the optical axis Z of the lens system, the first lens group comprising a pair of lenses, each of the pair of lenses having at least one lens surface that is a free-form surface, the pair of lenses configurable to be at least partially overlapping along the optical axis Z of the lens system, each lens of the pair of lenses having the same shape and being oppositely rotated with respect to each other along the optical axis Z of the lens system; and
a second lens group, arranged along the optical axis Z of the lens system, comprising a plurality of rotationally symmetrical lenses;
wherein the method comprises:
controlling a movement of a first lens of the pair of lenses of the first lens group along the Y-axis and a movement of a second lens of the pair of lenses of the first lens group in an opposite direction to the first lens of the pair of lenses along the Y-axis in accordance with the movement of the first lens of the pair of lenses along the Y-axis, to change a refractive power of the lens system; and controlling a movement of the second lens group along the optical axis Z of the lens system in accordance with the movement of the pair of lenses along the Y axis to maintain an image position of the lens system, wherein the lens system satisfies the conditions:

$$0.2<|\Delta LA|/ft \leq 0.85,$$

$$0.2<|\Delta LB|/ft \leq 0.85,$$

wherein $\Delta LA$ is the movement of the first lens of the pair of lenses of the first lens group along the Y-axis when the lens system changes from a maximum wide-angle state to a maximum telephoto state, $\Delta LB$ is the movement of the second lens of the pair of lenses of the first lens group along the Y-axis when the lens system changes from the maximum wide-angle state to the maximum telephoto state, and ft is the focal length of the lens system in the maximum telephoto state.

15. The non-transitory computer readable storage device according to claim 14, wherein the lens system satisfies the condition:

$$0.05<|\varphi 12W|\cdot fw \leq 0.35,$$

wherein $\varphi 12W$ is the combined axial refractive power of the pair of lenses of the first lens group in a maximum wide-angle state of the lens system, and fw is the focal length of the lens system in the maximum wide-angle state.

16. The non-transitory computer readable storage device according to claim 14, wherein the lens system satisfies the condition:

$$0.25<|\varphi 12T|\cdot ft \leq 0.95,$$

wherein $\varphi 12T$ is the combined axial refractive power of the pair of lenses of the first lens group in a maximum telephoto state of the lens system, and ft is the focal length of the lens system in the maximum telephoto state.

17. The non-transitory computer readable storage device according to claim 14, wherein the lens system satisfies the conditions:

$$|\varphi 12WX - \varphi 12WY|\cdot fw \leq 0.03,$$

$$|\varphi 12TX - \varphi 12TY|\cdot ft \leq 0.03,$$

wherein $\varphi 12WX$ is the combined axial refractive power of the pair of lenses of the first lens group along an X-axis of the lens system, perpendicular to the Y-axis and the optical axis Z of the lens system, in a maximum wide-angle state of the lens system; $\varphi 12WY$ is the combined axial refractive power of the pair of lenses of the first lens group along the Y-axis in the maximum wide-angle state; $\varphi 12TX$ is the combined axial refractive power of the pair of lenses of the first lens group along the X-axis at a maximum telephoto state of the lens system; $\varphi 12TY$ is the combined axial refractive power of the pair of lenses of the first lens group along the Y-axis at the maximum telephoto state of the lens system; fw is the focal length of the lens system at the maximum wide-angle state; and ft is the focal length of the lens system at the maximum telephoto state.

18. The non-transitory computer readable storage device according to claim 14, wherein the lens system satisfies the conditions:

$$0.85<|\varphi 12WX/\varphi 12WY|<1.15,$$

$$0.85<|\varphi 12TX/\varphi 12TY|<1.15,$$

wherein $\varphi 12WX$ is the combined axial refractive power of the pair of lenses of the first lens group along an X-axis of the lens system, perpendicular to the Y-axis and the optical axis Z of the lens system, in a maximum wide-angle state of the lens system; $\varphi 12WY$ is the combined axial refractive power of the pair of lenses of the first lens group along the Y-axis in the maximum wide-angle state; $\varphi 12TX$ is the combined axial refractive power of the pair of lenses of the first lens group along the X-axis in a maximum telephoto state of the lens system; and $\varphi 12TY$ is the combined axial refractive power of the pair of lenses of the first lens group along the Y-axis in the maximum telephoto state of the lens system.

19. The non-transitory computer readable storage device according to claim 14, wherein the magnitude of the movement of the first lens of the pair of lenses of the first lens group along the Y-axis is the same as the magnitude of the movement of the second lens of the pair of lenses of the first lens group along the Y-axis.

20. The non-transitory computer readable storage device according to claim 14, wherein the shape of the first lens and the second lens of the pair of lenses of the first lens group is symmetrical in a plane formed by the Y-axis and optical axis Z of the lens system.

* * * * *